US012811791B2

(12) United States Patent
Zhu

(10) Patent No.: US 12,811,791 B2
(45) Date of Patent: Nov. 24, 2026

(54) DATA PROCESSING METHOD AND APPARATUS BASED ON HIERARCHICAL CHAIN, DEVICE, AND MEDIUM

(71) Applicant: TENCENT TECHNOLOGY (SHENZHEN) COMPANY LIMITED, Shenzhen (CN)

(72) Inventor: Gengliang Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 19/212,111

(22) Filed: May 19, 2025

(65) Prior Publication Data

US 2025/0286719 A1 Sep. 11, 2025

Related U.S. Application Data

(63) Continuation of application No. PCT/CN2023/133268, filed on Nov. 22, 2023.

(30) Foreign Application Priority Data

Apr. 21, 2023 (CN) ......................... 202310458703.8

(51) Int. Cl.
*H04L 9/32* (2006.01)
*H04L 9/00* (2022.01)

(52) U.S. Cl.
CPC .......... *H04L 9/3221* (2013.01); *H04L 9/3236* (2013.01); *H04L 9/50* (2022.05)

(58) Field of Classification Search
CPC ....... H04L 9/3221; H04L 9/3236; H04L 9/50; H04L 9/3218; H04L 69/10; H04L 63/123;
(Continued)

(56) References Cited

U.S. PATENT DOCUMENTS

2020/0133955 A1* 4/2020 Padmanabhan ..... G06F 16/2379
2020/0403799 A1* 12/2020 De La Rocha Gómez-Arevalillo ............. H04L 9/3218
(Continued)

FOREIGN PATENT DOCUMENTS

CN 109462587 A 3/2019
CN 113259130 A 8/2021
(Continued)

OTHER PUBLICATIONS

The European Patent Office (EPO) The Extended European Search Report for Application No. 23933832.0 Feb. 5, 2025 11 Pages.
(Continued)

*Primary Examiner* — Harunur Rashid
(74) *Attorney, Agent, or Firm* — ANOVA LAW GROUP, PLLC

(57) ABSTRACT

Embodiments of this application disclose a data processing method and apparatus based on a hierarchical chain, a device, and a medium, which are applicable to the field of blockchain technologies. The method includes invoking the service aggregation process to execute the block to be processed to obtain a service execution result; determining a block execution result, and invoking the service aggregation process to optimize the block execution result, to obtain a block optimization result and an optimization proof; obtaining a result hash of the block execution result, a service hash of each service, the service execution proof, the optimization proof, and a blockhead of the block to be processed, a backhaul service to be backhauled to the local consensus node; and backhauling the backhaul service to obtain a service verification result to be returned to the service node.

20 Claims, 12 Drawing Sheets

(58) Field of Classification Search
CPC ..... H04L 9/3297; H04L 9/40; H04L 67/1095; H04L 67/1097; G06F 21/6245; G06F 21/64; G06Q 2220/00; G06Q 30/04; G06Q 40/04; Y02D 10/00
See application file for complete search history.

(56) References Cited

U.S. PATENT DOCUMENTS

| | | | | |
|---|---|---|---|---|
| 2021/0273812 | A1* | 9/2021 | Hardin | H04L 9/0894 |
| 2023/0316273 | A1* | 10/2023 | Zhu | G06Q 20/3825<br>705/75 |
| 2024/0039727 | A1* | 2/2024 | Chen | H04L 9/3218 |

FOREIGN PATENT DOCUMENTS

| | | | |
|---|---|---|---|
| CN | 113421097 | A | 9/2021 |
| CN | 114398451 | A | 4/2022 |
| WO | 2022271669 | A1 | 12/2022 |

OTHER PUBLICATIONS

Louis Tremblay Thibault et al., "Blockchain scaling using rollups: A comprehensive survey." IEEE Access 10 (2022): 93039-93054.
Thomas Lavaur et al., "Enabling blockchain services for ioe with zk-rollups." Sensors 22.17 (2022): 6493.
The World Intellectual Property Organization (WIPO) International Search Report for PCT/CN2023/133268 Jan. 23, 2024 5 Pages (including translation).

* cited by examiner

DATA PROCESSING METHOD AND APPARATUS BASED ON HIERARCHICAL CHAIN, DEVICE, AND MEDIUM

RELATED APPLICATIONS

This application is a continuation of PCT Application No. PCT/CN2023/133268, filed on Nov. 22, 2023, which claims priority to Chinese Patent Application No. 2023104587038, filed with the China National Intellectual Property Administration on Apr. 21, 2023 and entitled "DATA PROCESSING METHOD AND APPARATUS BASED ON HIERARCHICAL CHAIN, DEVICE, AND MEDIUM", which are incorporated herein by reference in their entirety.

FIELD OF THE TECHNOLOGY

This application relates to the field of blockchain technologies, and in particular, to a data processing method and apparatus based on a hierarchical chain, a device, and a medium.

BACKGROUND OF THE DISCLOSURE

In a double-layer chain network (also referred to as a hierarchical blockchain network structure) including a service layer and a consensus layer, a local consensus network for processing a local service may be deployed in the service layer, and a global consensus network for processing a global service may be deployed in the consensus layer. Currently, when sending a service associated with the local service (that is, a service) to a local consensus node in the local consensus network, the service node in the service layer sends the service in a plaintext form. Accordingly, the local consensus node may receive plaintext data of the service to subsequently perform block packaging on the plaintext data of the service, and then write a block packaged with the plaintext data into a blockchain maintained by the local consensus network. In addition, a blockchain deployed in the service layer is a local consensus sub-chain. In addition, when the local consensus node is configured to process the local service, to reduce global service processing pressure of the global consensus node in the global consensus network, the local consensus node does not forward the plaintext data of service data related to the local service to the global consensus node, and instead performs data aggregation on the service data in the block packaged with the plaintext data, and then uploads aggregation information obtained through data aggregation to the global consensus network.

However, although the local consensus node in the hierarchical structure of the blockchain network can perform data aggregation to ensure service decoupling between the local service processed in the local consensus network and the global service processed in the global consensus network, after the local consensus node deployed in the local consensus network writes the block packaged with the plaintext data into the local consensus sub-chain, the plaintext data written into the block on the local consensus sub-chain can still be synchronized by the service node on the same service layer. As a result, once the plaintext data written into the block on the local consensus sub-chain is sensitive data, the sensitive data on the local consensus sub-chain maintained by the local consensus network is locally public and transparent. This means that each service node that is located on the same service layer and that performs data exchange with the local consensus network can synchronize the sensitive data from the local consensus sub-chain indiscriminately. Therefore, how to ensure privacy and security of the sensitive data in the entire local consensus network is a technical problem that needs to be resolved.

SUMMARY

Embodiments of this application provide a data processing method and apparatus based on a hierarchical chain, a device, and a medium. A service processing node may be deployed in a hierarchical blockchain network corresponding to a hierarchical blockchain, and a service aggregation process may be deployed in the service processing node, to execute each service that carries sensitive data and optimize sensitive data carried in a service execution result of each service. This means that service data carried in a backhaul service subsequently submitted by the service processing node to a local consensus node may include an optimized service execution result. That is, in the embodiments of this application, the backhaul service backhauled by the service processing node can improve privacy and security of sensitive data.

One aspect of the embodiments of this application provides a data processing method based on a hierarchical chain, a hierarchical chain network corresponding to the hierarchical chain comprising a local consensus network deployed in a service layer and a global consensus network deployed in a consensus layer, a local consensus node and a service processing node being deployed in the service layer, the local consensus node being a consensus node in the local consensus network, the global consensus node deployed in the consensus layer being a consensus node in the global consensus network, the local consensus node being configured to: when determining that the service aggregation process of the service processing node has been registered and examined on the global consensus node, authorize the service processing node to start the service aggregation process, the method being performed by the service processing node.

The method comprises invoking, when N services are aggregated and packaged into a block to be processed, the service aggregation process to execute the block to be processed, to obtain a service execution result of each service and a service execution proof associated with each service, N being a positive integer, each service being a sensitive service that carries sensitive data and that is transmitted by a service node associated with the local consensus node, and the service execution proof indicating that each service is correctly executed; determining the service execution result of each service as a block execution result of the block to be processed, and invoking the service aggregation process to optimize the block execution result, to obtain a block optimization result and an optimization proof associated with the block execution result; obtaining, based on the block optimization result, a result hash of the block execution result, a service hash of each service, the service execution proof, the optimization proof, and a blockhead of the block to be processed, a backhaul service to be backhauled to the local consensus node; and backhauling the backhaul service to the local consensus node, the local consensus node invokes verification processing data corresponding to the service aggregation process, to perform service verification on the backhaul service to obtain a service verification result to be returned to the service node.

Another aspect of the embodiments of this application provides a data processing method based on a hierarchical chain including a hierarchical chain network corresponding to the hierarchical chain including a local consensus network deployed in a service layer and a global consensus network deployed in a consensus layer, a local consensus node and a service processing node being deployed in the service layer, the local consensus node being a consensus node in the local consensus network, the global consensus node deployed in the consensus layer being a consensus node in the global consensus network, the local consensus node being configured to: when determining that the service aggregation process of the service processing node has been registered and examined on the global consensus node, authorize the service processing node to start the service aggregation process, the method being performed by the local consensus node.

The method includes receiving a backhaul service transmitted by the service processing node, the backhaul service being obtained based on a block optimization result, a result hash of a block execution result, a service hash of each of N services included in the block to be processed, a service execution proof, an optimization proof, and a blockhead of the block to be processed, N being a positive integer, each service being a sensitive service that carries sensitive data and that is transmitted by a service node associated with the local consensus node, and the service execution proof being an evidence for indicating that each service is correctly executed, the block execution result being determined based on a service execution result of each service, a service execution result and a service execution proof of each service being obtained by the service processing node by invoking the service aggregation process to execute the block to be processed, and the block optimization result and the optimization proof being obtained by the service processing node by invoking the service aggregation process to optimize the block execution result; and invoking verification processing data corresponding to the service aggregation process, to perform service verification on the backhaul service to obtain a service verification result, and returning the service verification result to the service node.

Another aspect of the embodiments of this application provides a computer device, including a memory and a processor, the memory being connected to the processor, the memory being configured to store a computer program, and the processor being configured to invoke the computer program, so that the computer device performs the method provided in the embodiments of this application.

In the embodiments of this application, in a basic infrastructure of a hierarchical chain network (a global consensus network and a local consensus network), the local consensus network may be deployed in a service layer, and the global consensus network may be deployed in a consensus layer. In addition, to ensure service privacy and security of some services (for example, sensitive services) associated with the local consensus network, in the embodiments of this application, a service processing node independent of a local consensus node may be deployed in the service layer of the hierarchical chain network. The local consensus node may be configured to: when determining that a service aggregation process of the service processing node has been registered and examined on the global consensus node, authorize the service processing node to start the service aggregation process.

In the embodiments of this application, when obtaining a block to be processed including N services, the service processing node may further invoke the service aggregation process to execute the N services in the block to be processed, to obtain a service execution result of each of the N services and a service execution proof associated with each service. The service execution proof may be an evidence for indicating that each service is correctly executed. Then, the service processing node may invoke the service aggregation process to optimize, by using a block as a unit, a block execution result determined based on each service execution result, to obtain a block optimization result and an optimization proof. Accordingly, the service processing node may construct, based on all results (for example, the block optimization result, a result hash of the block execution result, a service hash of each service, the service execution proof, the optimization proof, and a blockhead of the block to be processed) obtained by invoking the service aggregation process, a backhaul service to be backhauled to the local consensus node, and backhaul the backhaul service to the local consensus node. Therefore, the local consensus node may invoke verification processing data corresponding to the service aggregation process, to perform service verification to obtain an optimized service execution result of each service after data of the service execution result is optimized. That is, embodiments of this application ensure privacy and security of service data of a sensitive service related to the local consensus node in the data exchanges among the global consensus node, the local consensus node, and the service processing node.

DESCRIPTION OF EMBODIMENTS

Figure 1:
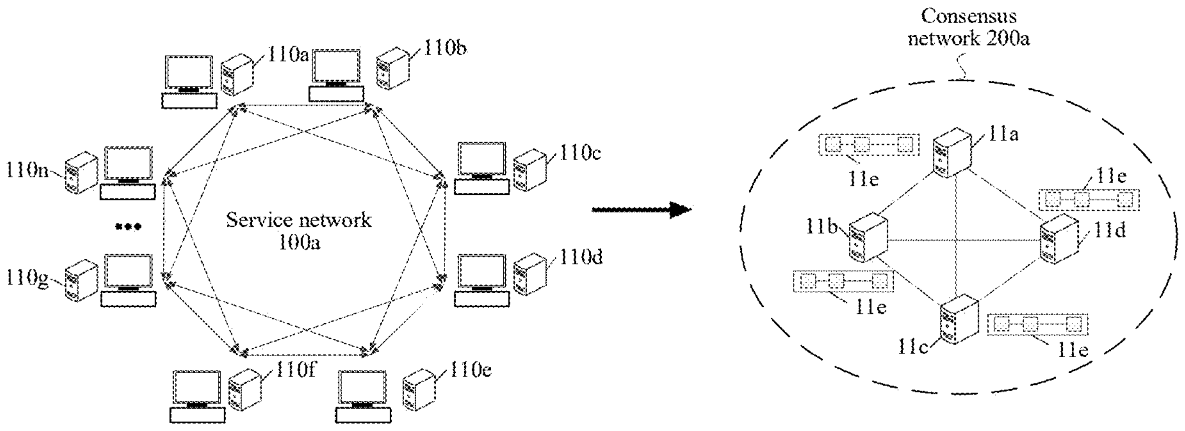
FIG. 1 is a schematic diagram of a hierarchical structure of a blockchain network according to an embodiment of this application.

FIG. 1 is a schematic diagram of a hierarchical structure of a blockchain network according to an embodiment of this application. The hierarchical structure of the blockchain network can be applied to a blockchain electronic billing system. A blockchain network corresponding to this blockchain electronic billing system may include a service network deployed in a public network and a consensus network (also known as a witness network) deployed in private cloud. The service network may be a service network 100*a* shown in FIG. 1, and the consensus network may be a consensus network 200*a* shown in FIG. 1. The hierarchical structure of the blockchain network is specifically a hierarchical structure including a service layer and a consensus layer. In the blockchain network, to implement network isolation between the service network and the consensus network, in the embodiments of this application, the service network may be deployed in the service layer of the hierarchical structure, and the consensus network may be deployed in the consensus layer of the hierarchical structure.

A plurality of service nodes may be deployed in the service network 100*a* shown in FIG. 1. The plurality of service nodes may specifically include a service node 110*a*, a service node 110*b*, a service node 110*c*, a service node 110*d*, a service node 110*e*, a service node 110*f*, a service node 110*g*, . . . , and a service node 110*n* shown in FIG. 1. A quantity of service nodes deployed in the service network 100*a* is not limited herein. As shown in FIG. 1, each service node running in the service network 100*a* may exchange data with the consensus node in the consensus network.

For example, in the hierarchical structure of the blockchain network, a service node may submit a service (for example, an electronic bill issuance service) to the consensus node in the consensus network in a service form. Accordingly, after the consensus node packages the service (for example, the electronic bill issuance service) into a block, and links the block including the service to the blockchain maintained by the consensus network, the consensus node may authorize the service node to clear and synchronize the service (for example, the electronic bill issuance service) related to the service node on the blockchain maintained by the consensus network. In addition, when the service node clears and synchronizes the service related to the service node on the blockchain, the service node may further clear and synchronize service data of the service. For example, the service data may be specifically an electronic bill issued by the consensus node for the electronic bill issuance service.

A plurality of consensus nodes are deployed in the consensus network 200*a* shown in FIG. 1. The plurality of consensus nodes may specifically include a consensus node 11*a*, a consensus node 11*b*, a consensus node 11*c*, and a consensus node 11*d* shown in FIG. 1. A quantity of consensus nodes deployed in the consensus network 200*a* is not limited herein. In addition, as shown in FIG. 1, for the plurality of consensus nodes running in the consensus network 200*a*, a blockchain that is jointly maintained is specifically a blockchain 11*e* shown in FIG. 1.

In the blockchain electronic billing system, the service network and the consensus network can also interact through routing boundaries. As the consensus network is located in relatively secure private cloud and there is already a consensus mechanism to ensure security of accessing each other, additional identity management and network control are not required. However, the service node is located in a public network and may be accessed by other uncertain network terminals. Therefore, behaviors of the service node and other possible nodes accessing the consensus network need to be strictly controlled.

The blockchain (for example, the global consensus chain and the local consensus sub-chain) in the embodiments of this application is a new application mode of a computer technology such as distributed data storage, point-to-point transmission, a consensus mechanism, and an encryption algorithm, and is mainly configured to sort data in chronological order and encrypt the data into a ledger, so that the data cannot be tampered with or forged, and the data can be verified, stored, and updated. The blockchain is essentially a decentralized database. Every node in the database stores the same blockchain.

In the blockchain electronic billing system, the consensus node may be responsible for reaching consensus in the consensus network (for example, the consensus network 200*a*) where the blockchain (for example, the blockchain 11*e*) is located. For the consensus network 200*a*, a specific process in which the consensus node writes, into a corresponding blockchain ledger (for example, a distributed database), a service (for example, the electronic bill issuance service) submitted to the consensus network 200*a* may be: A user client sends a service (for example, the electronic bill issuance service) to a service node. Then, the service (for example, the electronic bill issuance service) is successively transferred between service nodes in a service network in the blockchain network, until a consensus node deployed in the consensus network 200*a* in the blockchain network (for example, the consensus node 11*b* in the consensus network 200*a*) receives the service (for example, the electronic bill issuance service). In this case, the consensus node (for example, the consensus node 11*b* in the consensus network 200*a*) further packages the service (for example, the electronic bill issuance service) into a block, to facilitate subsequent consensus with another consensus node on the currently packaged block, and after the consensus is reached on the block, the consensus node may write the block on which consensus is reached into a distributed database of the consensus network (for example, the consensus network 200*a*) of the consensus node.

In the blockchain electronic billing system, a smart contract may be deployed on the blockchain 11*e* of the consensus network 200*a*. The smart contract in the blockchain electronic billing system may be understood as a code that can be understood and executed by consensus nodes, and any logic may be executed to obtain a result through the smart contract. For example, if a user needs to execute a service, a user client may initiate a service request for the service, to access and invoke a smart contract already deployed on a blockchain (for example, the blockchain 11*e*) maintained by the consensus network (for example, the consensus network 200*a*).

Specifically, the service node in the service network may send the service request to a consensus node (for example, the consensus node 11*a* shown in FIG. 1) in the consensus network 200*a*, to perform, through a chain entrance of the consensus network 200*a*, identity authentication on the user sending the service request, and when the identity authentication succeeds, the service request sent by the user is allowed to be sent to another consensus node (for example, the consensus node 11*b* shown in FIG. 1) in the consensus network 200*a*. Then, a smart contract can be run in the consensus node (for example, the consensus node 11*a* and the consensus node 11*b* shown in FIG. 1) to execute the service requested by the user.

One or more smart contracts (the smart contract is essentially executable service processing data) may be deployed on the blockchain (for example, the blockchain 11*e*) maintained by the consensus network (for example, the consensus network 200*a*). The smart contracts may be distinguished through contract invoking addresses, contract identities (ID), or contract names. Moreover, the service request initiated by the user client may also carry a contract invoking address, a contract identity, or a contract name of a smart contract, to specify the smart contract that needs to be run.

In the blockchain electronic billing system, a peer-to-peer (P2P) network may be formed between any two blockchain nodes in the consensus network (for example, the consensus network 200*a*). The peer-to-peer network may use a P2P protocol. The P2P protocol is an application layer protocol that is run based on the transmission control protocol (TCP). Any device, such as a server or a terminal, may be added to a distributed system to become a blockchain node. Each blockchain node may include a hardware layer, an intermediate layer, an operating system layer, and an application layer.

In addition, in the blockchain electronic billing system, to ensure service privacy, isolation, and security of electronic bill derived services associated with service nodes deployed in different regions (for example, provinces) in the service network, in the embodiments of this application, different consensus networks may be respectively deployed in the service layer of the service network for the service nodes of the different regions (for example, provinces) by using a region (for example, provinces) as a unit, and then, the electronic bill derived services of the different regions (for example, provinces) may be respectively executed by the consensus nodes in the different consensus networks deployed in the service layer. For example, in the service layer, one region (for example, one province) may correspond to one consensus network. For ease of understanding, in the embodiments of this application, an example of one consensus network deployed in the service layer is used. Therefore, consensus networks deployed in the service layer are collectively referred to as local consensus networks, and consensus networks deployed in the consensus layer are collectively referred to as global consensus networks. Further, a consensus node in the local consensus network may be referred to as a local consensus node, and a consensus node in the global consensus network may be referred to as a global consensus node. On this basis, in the embodiments of this application, a blockchain maintained by a local consensus node in the local consensus network may be referred to as a local consensus sub-chain, and a blockchain maintained by a global consensus node in the global consensus network may be referred to as a global consensus chain. Blockchains (for example, the global consensus chain and the local consensus sub-chain) in the hierarchical structure may be collectively referred to as hierarchical chains.

The global consensus node in the global consensus network may be configured to perform global services (that is, bill services whose service attributes are global, such as an electronic bill issuance service, an electronic bill transfer service, and an electronic bill reimbursement service) associated with the electronic bill, and the local consensus node in the local consensus network may be configured to perform local services (that is, other bill services whose service attributes are local, for example, some electronic bill derived services associated with the electronic bill, such as a credibility query service and an invoice correction service for an issued electronic invoice) associated with the electronic bill.

Further, based on the hierarchical structure of the blockchain network, an embodiment of this application further provides an improved hierarchical chain network. The improved hierarchical chain network includes a local consensus network deployed in a service layer and a global consensus network deployed in a consensus layer. The global consensus network is independent of the local consensus network. For ease of understanding, in this embodiment, blockchains maintained by the local consensus network deployed in the service layer may be collectively referred to as a local consensus sub-chain, and blockchains maintained by the global consensus network deployed in the consensus layer may be collectively referred to as a global consensus chain. In addition, in this embodiment, consensus nodes in the local consensus network may be collectively referred to as a local consensus node, and consensus nodes in the global consensus network may be collectively referred to as a global consensus node.

In this embodiment, in the service network 100*a* in the hierarchical structure, a region may be used as a division unit, and networks used for processing corresponding regional services are configured or deployed for all regions. These configured or deployed networks used for processing corresponding regional services are local consensus networks, and consensus nodes in these local consensus networks are all located in the service network 100*a*. Accordingly, a blockchain network corresponding to the improved hierarchical structure may be constructed by using these local consensus networks configured in the service layer and the consensus network (that is, the global consensus network) configured in the consensus layer.

The consensus node in the local consensus network deployed in the service layer is essentially a service node (that is, an SPV node) on which a local consensus protocol runs. For example, for ease of understanding, an example of a province as the division unit is used herein. A local consensus network 201 shown in FIG. 2 may be configured for a province. Local consensus nodes in the local consensus network are provincial SPV nodes on which the local consensus protocol runs. The provincial SPV nodes on which the local consensus protocol runs may be collectively referred to as a provincial SPV local consensus node, and blockchains maintained by the provincial SPV local consensus nodes are local consensus sub-chains.

A local consensus network is a network used for processing regional services. The consensus network 200*a* in the hierarchical structure may be a global consensus network 202 shown in FIG. 2. A blockchain maintained by a consensus node in the global consensus network 202 is the global consensus chain. The global consensus chain may also be referred to as a global chain, a global consensus main chain, or the like.

In this embodiment, if a global consensus network used for processing a global service is already deployed in the consensus layer, one or more networks used for processing regional services are further deployed in the service layer by using the service node in the service network 100*a*. For ease of understanding, in this embodiment, the one or more networks used for processing regional services deployed in the service layer may be referred to as local consensus networks under the global consensus network, that is, a quantity of local consensus networks under the global consensus network may be one or more. When one local consensus network is used for maintaining one local consensus sub-chain, a quantity of local consensus sub-chains maintained by the local consensus network deployed in the service layer may also be one or more. The local consensus network under the global consensus network is used to describe that a service processing level of the global consensus network deployed in the consensus layer is higher than a service processing level of the local consensus network deployed in the service layer. Therefore, a local consensus network having a lower service processing level may be referred to as a local consensus network under the global consensus network.

One local consensus network may be used for processing a service submitted by a service node in one region. Therefore, when a plurality of local consensus networks are deployed in the service layer, different local consensus networks may be used for processing services submitted by service nodes in different regions. However, in the improved hierarchical structure, the global consensus network not only may be used for processing some global services, but also may be used for processing an aggregation information service submitted by a local consensus node in each local consensus network after service aggregation is performed on some regional services on the local consensus sub-chain. A blockchain network corresponding to the improved hierarchical structure is a hierarchical chain network, and a hierarchical chain maintained by the hierarchical chain network may specifically include the local consensus sub-chain and global consensus chain.

In the hierarchical chain maintained by the hierarchical chain network, services associated with service nodes in different regions may be stored on different local consensus sub-chains by local consensus nodes in local consensus networks in corresponding regions. For example, in the blockchain electronic billing system, a global service executed by the global consensus node in the global consensus network may be specifically a bill service in a global region whose service attribute is global, and a local service executed by the local consensus node in the local consensus network may be specifically another bill service whose service attribute is local in each region under the global region.

For example, in this embodiment, a local consensus network may be deployed for each region under the global region (for example, a plurality of provincial or ministerial regions under the global region). Each local consensus network may be configured to perform data exchange with a service node (for example, a service SPV node in the provincial or ministerial region shown in FIG. 2) in the corresponding region, to implement service processing in the corresponding region. For example, when being configured to process a local service in a corresponding region, the local consensus node in each local consensus network may be specifically configured to process a credibility query service, an invoice correction service, and the like in the corresponding region. Based on this, the local consensus network used for performing service processing on a service in the provincial or ministerial region may also be referred to as a provincial local consensus network, and a local consensus sub-chain maintained by the provincial local consensus network may be referred to as a provincial local consensus sub-chain.

By analogy, the provincial local consensus network may further be subdivided into more fine-grained regional local consensus networks. For example, a local consensus network in a subdivided region (for example, a district region under the provincial or ministerial region) may be deployed under the provincial local consensus network. Then, a local consensus network corresponding to the district region under the provincial or ministerial region may be referred to as a district local consensus network. Each district local consensus network is configured to maintain a corresponding district local consensus sub-chain. Each district local consensus network may be configured to perform data exchange with a service node in a district region, to implement service processing (for example, bill service processing) in the district region.

Figure 2:
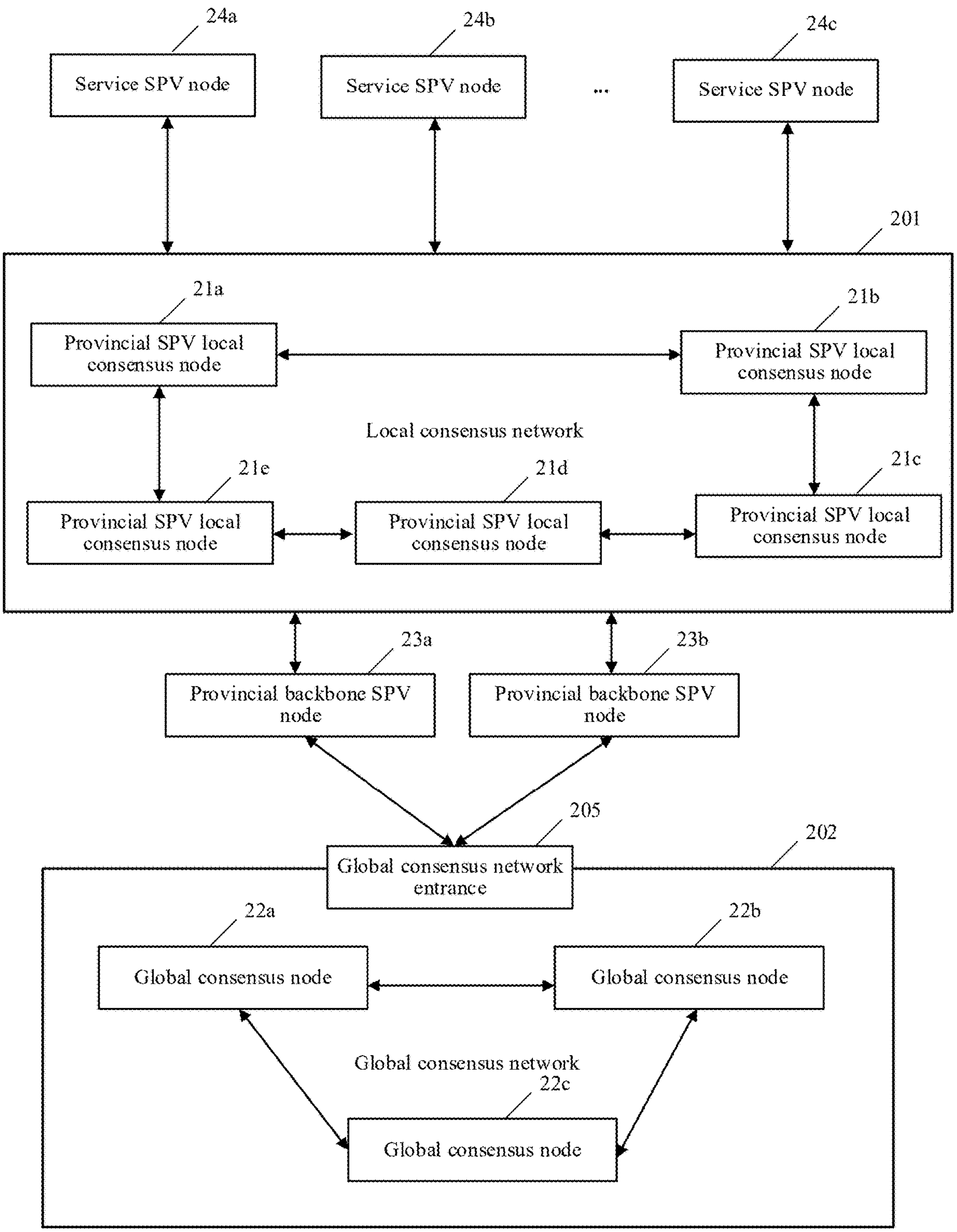
FIG. 2 is a schematic structural diagram of a hierarchical chain network according to an embodiment of this application.

For ease of understanding, refer to FIG. 2. FIG. 2 is a schematic structural diagram of a hierarchical chain network according to an embodiment of this application. As shown in FIG. 2, the hierarchical chain network may include a local consensus network 201 and a global consensus network 202. The local consensus network 201 may be configured to maintain a local consensus sub-chain and perform service processing on a service (for example, a local service, where the local service may be specifically the regional service) submitted by a service node in a corresponding region. That is, the local consensus network 201 is a network deployed in the service layer and configured to process the regional service in the corresponding region, for example, the provincial local consensus network configured to process a service in the provincial or ministerial region, and the provincial local consensus network may be deployed by a provincial organization in the blockchain electronic billing system. When the local consensus network shown in FIG. 2 is a provincial local consensus network, each consensus node in the provincial local consensus network is a local consensus node. The local consensus node may be specifically a provincial SPV local consensus node. For example, each provincial SPV local consensus node may include but is limited to a provincial SPV local consensus node 21*a*, a provincial SPV local consensus node 21*b*, . . . , and a provincial SPV local consensus node 21*e* shown in FIG. 2.

In the hierarchical chain network, one or more local consensus networks may be deployed under the global consensus network, to process services in corresponding regions. For ease of understanding, an example of the local consensus network 201 shown in FIG. 2 as the local consensus network deployed under the global consensus network is used for description herein. For a local consensus network corresponding to another region, refer to related descriptions of the local consensus network 201, and details are not described herein again.

The global consensus network 202 shown in FIG. 2 may be configured to maintain a global consensus chain in a hierarchical chain, and may perform service processing on a global service submitted by a service node in a service network, for example, may perform service processing on a bill service in a global region whose service attribute is global. As shown in FIG. 2, each consensus node in the global consensus network 202 is a global consensus node, and the global consensus node may include but is not limited to a global consensus node 22*a*, a global consensus node 22*b*, and a global consensus node 22*c* shown in FIG. 2.

When the local consensus sub-chain is deployed in the local consensus network 201, the local consensus sub-chain subsequently maintained by the local consensus network 201 needs to be registered in advance on the global consensus chain maintained by the global consensus network 202, so that the local consensus sub-chain may be run in the local consensus network 201 when sub-chain registration succeeds.

A specific process of registering the local consensus sub-chain on the global consensus chain may be described as: A service object may send a registration service and a configuration service for the local consensus sub-chain to the global consensus node, so that the global consensus node may activate the local consensus network based on the received registration service, may configure a chain identification for the local consensus sub-chain and configure genesis information for a genesis block in the local consensus sub-chain when executing the configuration service, and may use the configured chain identification and genesis information of the local consensus sub-chain as configuration information of the configuration service. Accordingly, when subsequently obtaining the configuration information, the local consensus node may further obtain the genesis information for the genesis block in the local consensus sub-chain carried in the configuration information, and then create the genesis block in the local consensus sub-chain based on the genesis information, to start the local consensus sub-chain, thereby completing creation of the local consensus network and the local consensus sub-chain.

The local consensus node in the local consensus network may synchronize, from the global consensus chain, a target consensus block into which the registration service is written. The registration service is a service that is submitted by a service object to the global consensus node by using a service node and is used for requesting registration of the local consensus sub-chain. The registration service is a service that is submitted by a service object to the global consensus node by using a service node and is used for requesting configuration of the genesis block of the local consensus sub-chain.

The target consensus block further includes the configuration service corresponding to the registration service, and the configuration information corresponding to the configuration service carries the chain identification (for example, the chain identification of the local consensus sub-chain is L1) configured by the global consensus node for the local consensus sub-chain and the genesis information configured by the global consensus node for the genesis block on the local consensus sub-chain. Then, when obtaining the configuration information corresponding to the configuration service from the target consensus block, the local consensus node may obtain, from the configuration information, the genesis information of the genesis block to be created on the local consensus sub-chain, then after information verification on the genesis information succeeds, create, in the local consensus network by using the genesis information, the genesis block used for starting the local consensus sub-chain, and start the local consensus sub-chain based on the genesis block. The genesis block is the first block that is written into the local consensus sub-chain by the local consensus node in the local consensus network after the local consensus sub-chain is started.

When starting the local consensus sub-chain in the local consensus network for the first time, it needs to be verified whether genesis information in the genesis block created in the local consensus network is consistent with genesis information of the local consensus sub-chain (for example, the local consensus sub-chain whose chain identification is L1) registered with the global consensus chain, and the local consensus sub-chain is started when it is verified that the genesis information in the genesis block created in the local consensus network is consistent with the genesis information of the local consensus sub-chain registered with the global consensus chain.

Further, in this embodiment, when a district local consensus network is deployed under a provincial local consensus network, another local consensus sub-chain for processing a subdivided service may also be registered on a local consensus sub-chain maintained by the provincial local consensus network.

Data exchange may be performed between the local consensus network 201 and the global consensus network 202, so that a secure and efficient service flow system may be constructed while the local consensus network 201 and the global consensus network 202 cooperate with each other. The blockchain electronic billing system using the improved hierarchical structure not only can facilitate hierarchical implementation of service governance of various services related to an electronic bill, but also can ensure that various regions independently run services in these regions. Besides, traffic of an entire service union does not need to be gathered to the global consensus chain. This can implement data isolation, service privacy isolation, and compliance for services in different regions, and can ensure that the global consensus network does not need to carry a large quantity of subdivided services and therefore can be more focused on global governance of global services (for example, an electronic bill issuance service related to an electronic bill).

The local consensus node in the local consensus network may essentially be a lightweight node (that is, the simplified payment verification (SPV) node) in the service network. That is, a local consensus node in the local consensus network 201 may synchronize and clear, from a global consensus chain maintained by the global consensus network 202, service data of a global service associated with the local consensus node (for example, the local consensus network 201), and does not need to synchronize all block data in the global consensus chain and instead needs to maintain all block data in the local consensus sub-chain. Therefore, when the local consensus network is a provincial local consensus network, a local consensus node in the provincial local consensus network may also be referred to as a provincial SPV local consensus node.

The provincial local consensus network may synchronize service data of a global service related to the provincial local consensus network from the global consensus chain by using the provincial main chain SPV node. For example, in this embodiment, when processing a local service, the local consensus network may cite service data of a global service synchronized from the global consensus chain. The service data of the global service may be specifically a read key-value set in service status data of a smart contract (that is, the service processing data) used by the global consensus node when executing the global service in a block. For example, when obtaining an electronic bill related to a service node from the global consensus chain, the service node corresponding to a service object may further submit a prize drawing service for the electronic bill to the local consensus node in the local consensus network. In this case, the local consensus node may determine, from other data synchronized from the global consensus chain and associated with prize drawing of the electronic bill, related data needed to perform the prize drawing service, for example, data such as a list of enterprises participating in prize drawing and a ratio of participating in prize drawing, and then perform the prize drawing service based on the related data.

A service submitted to the local consensus network 201 is not forwarded to the global consensus network, and instead only needs to be locally packaged in the local consensus network to obtain a block for consensus, and the block on which consensus is reached is linked to the local consensus sub-chain. In an embodiment, if required, information aggregation may be performed on block information in blocks on the local consensus sub-chain maintained by the local consensus network, so that aggregation information obtained through aggregation may be uploaded to the global consensus network in a service (that is, a global service) form. For example, after receiving a prize drawing service (the prize drawing service is a local service) submitted by a service node in a corresponding region, a local consensus node (21*a* shown in FIG. 2) in the local consensus network

201 may not directly forward each received prize drawing service to the global consensus network, and instead autonomously execute the prize drawing service in the local consensus network 201, and link a prize drawing result obtained after prize drawing services are executed to the local consensus sub-chain. Then, after completing prize drawing services in a cycle, the local consensus node (21*a* shown in FIG. 2) in the local consensus network 201 may obtain prize drawing results in the cycle from block information of a block in the local consensus sub-chain, and perform information aggregation on prize drawing results in the cycle, for example, aggregate information such as an accumulated quantity of times each prize is won in the cycle. Then, the local consensus node may encapsulate aggregation information obtained through aggregation into an aggregation service, and may submit the aggregation service to the global consensus node in the global consensus network 202 in a service form.

In the blockchain electronic billing system corresponding to the hierarchical chain network, a service node (an SPV node) configured to perform data exchange between the local consensus network 201 and the global consensus network 202 is referred to as a provincial main chain SPV node. As shown in FIG. 2, a plurality of provincial main chain SPV nodes may perform data exchange between the local consensus network 201 and the global consensus network 202. In this case, the plurality of provincial main chain SPV nodes may specifically include, but are not limited to, a provincial main chain SPV node 23*a* and a provincial main chain SPV node 23*b* shown in FIG. 2. Roles, data, and permissions of the provincial main chain SPV nodes configured to perform data exchange between the local consensus network 201 and the global consensus network 202 are completely the same.

As shown in FIG. 2, 2 provincial main chain SPV nodes configured to perform data exchange between a global consensus network and a local consensus network may represent service active-active. For example, any one of the 2 provincial main chain SPV nodes may synchronize ledger data of the global consensus chain maintained by the global consensus network 202 to the local consensus node in the local consensus network, so that the local consensus node may perform service processing of other local services (for example, the prize drawing service and the credibility query service) based on the ledger data of the global consensus chain.

The provincial main chain SPV node is essentially a service node in the service network that is configured to perform ledger synchronization with the global consensus network. Therefore, in one or more embodiments, the provincial main chain SPV node may be further configured to receive a global service (for example, an archive configuration service for archiving local consensus data on the local consensus sub-chain) submitted by each service object by using a user client.

Specifically, when a service object needs to archive the local consensus sub-chain, the service object may submit the global service (for example, the archive configuration service for archiving local consensus data on the local consensus sub-chain) to the provincial main chain SPV node, then the provincial main chain SPV node may forward the received global service (for example, the archive configuration service for archiving local consensus data on the local consensus sub-chain) to a network entrance (for example, a global consensus network entrance 205 shown in FIG. 2) of the global consensus network, and then the global consensus network entrance 205 may forward the received global service to the global consensus node, for example, the global consensus node 22*a*, the global consensus node 22*b*, and the global consensus node 22*c* in FIG. 2.

In one embodiment, the provincial main chain SPV node may further receive a global service (for example, the aggregation service) sent by the local consensus node, and may forward, to the global consensus network entrance 205, the global service (for example, the aggregation service) sent by the local consensus node. For example, the local consensus node may perform information aggregation on service data of a service of a service type on the local consensus sub-chain, generate the aggregation service, and then send the aggregation service to the provincial main chain SPV node. In this case, when receiving the aggregation service sent by the local consensus node (for example, the provincial SPV local consensus node 21*a*), the provincial main chain SPV node may further forward the aggregation service to the global consensus network entrance 205, then the global consensus network entrance 205 may forward the received aggregation service to the global consensus nodes in the global consensus network, and then these global consensus nodes may subsequently link the aggregation service to the global consensus chain.

The service nodes in the hierarchical chain network may include the service node (for example, the provincial main chain SPV node) configured to synchronize ledger data of the global consensus chain, and may further include service nodes configured to synchronize ledger data of the local consensus sub-chain. These service nodes configured to synchronize the ledger data of the local consensus sub-chain may be service SPV nodes. In this embodiment, the service SPV node performing data exchange with the local consensus network is mainly responsible for submitting a local transaction to the local consensus network and synchronizing ledger data of each block on the local consensus sub-chain. For example, the service SPV node may include, but is not limited to, a service SPV node 24*a*, a service SPV node 24*b*, and a service SPV node 24*c* shown in FIG. 2.

For ease of understanding, in this embodiment, service nodes (for example, the provincial main chain SPV nodes) configured to synchronize ledger data of the global consensus chain may be collectively referred to as a global service node. The global service node may specifically include, but is not limited to, a cross-chain relay that performs data exchange between the local consensus network and the global consensus network. That is, the cross-chain relay is essentially an SPV node deployed in a service layer. Similarly, in this embodiment, service nodes (for example, the service SPV nodes) configured to synchronize ledger data of the local consensus sub-chain may be collectively referred to as a local service node. A service submitted by the global service node to the global consensus node is the global service, and a service submitted by the local service nodes to the local consensus node is the local service. For ease of understanding, in this embodiment, the global service node configured to submit the global service and the local service node configured to submit the local service may be collectively referred to as a service node. Based on this, in this embodiment, the local service node may be referred to as a next-level service node of the global service node.

As shown in FIG. 2, the service SPV node may be a service node in a region corresponding to the local consensus network 201, and may exchange data with the local consensus network 201. For example, the provincial SPV local consensus node (21*a* shown in FIG. 2) may receive a local service for the local consensus sub-chain that is sent by a service SPV node (the service SPV node 24*a* shown in FIG. 2), and then the provincial SPV local consensus node (21*a* shown in FIG. 2) verifies whether the received local service is legal, and packages and reaches consensus on the local service whose verification succeeds, to package and link the local service to the provincial local consensus sub-chain (that is, the local consensus sub-chain) maintained by the provincial SPV local consensus node.

Under the provincial local consensus network, there may be a next-level local consensus network (for example, a district local consensus network may further be included under the provincial local consensus network) and a next-level service node (that is, a next local service node, for example, a next-level service SPV node of the local service node) that is configured to perform data exchange with the next-level local consensus network. Although these next-level service nodes do not directly synchronize ledger data of the global consensus chain, these next-level service nodes may synchronize ledger data of a provincial local consensus sub-chain maintained by the provincial local consensus network, to synchronize ledger data related to these next-level service nodes from the provincial local consensus sub-chain. This means that when the provincial local consensus network synchronizes service data related to a local service from the global consensus chain by using the provincial main chain SPV node, a next-level service node may indirectly obtain, by using the provincial local consensus network, the service data related to the local service synchronized from the global consensus chain. In addition, the next-level service nodes may further be configured to synchronize ledger data of the local consensus network 201 (for example, a provincial local consensus network), and obtain ledger data related to the next-level service nodes (for example, a district local consensus node and a service SPV node) also through secure SPV data cleaning.

A BoomFilter is generally disposed in a connection between an SPV node and a neighboring node. For example, a neighboring node of a provincial main chain SPV node is a global consensus node in a global consensus network, and a neighboring node of a service SPV node is a local consensus node in the local consensus network. If a neighboring node sees that a service satisfies a BoomFilter condition of an SPV node, the neighboring node sends a block to the SPV node by using a merkleblock message (a message form). The merkleblock message includes a blockhead and a Merkle path connected to a Merkle root of the service. The SPV node may associate, by using the Merkle path, a service with a block including the service, and verify, by using the blockhead, that the block including the service is on the blockchain and has been confirmed. The two verifications may prove that the service exists on the blockchain and the SPV node may synchronize corresponding service data from the neighboring node.

For example, when an SPV node is a provincial main chain SPV node, service data of a global service related to the SPV node may be synchronized from a neighboring node (that is, a global consensus node). In an embodiment, when an SPV node is a service SPV node, service data of a local service related to the SPV node may be synchronized from a neighboring node (for example, a local consensus node).

When obtaining a service (for example, a local service) submitted by the service node in a plaintext form, the local consensus network performs service processing on service data in the service (for example, the local service) submitted in the form of a plaintext. If some sensitive data exists in the service data, privacy and security of the related sensitive data cannot be ensured. Based on this, in this embodiment, a service processing node related to the local consensus network is deployed in the hierarchical chain network corresponding to the improved hierarchical structure. A service aggregation process run on the service processing node may be a target data rollup service or a target data layer 2 service for optimizing sensitive data.

For example, the service aggregation process deployed on the service processing node may be configured to directly receive a service related to sensitive data that is submitted by a service node. In an embodiment, the service aggregation process deployed on the service processing node may be further configured to indirectly receive a service related to sensitive data that is submitted by another service node to the local consensus network, to further optimize the sensitive data in the obtained service, and generate, based on the optimized sensitive data, a backhaul service to be backhauled to the local consensus node in the local consensus network. Accordingly, when the local consensus node subsequently links the backhaul data to the local consensus sub-chain, because the service data in the backhaul service is optimized data obtained after optimizing the sensitive data in the service, this embodiment can ensure that the original data of the sensitive data is not linked to the local consensus sub-chain, and therefore ensure that another service node located in the same region as the local consensus network cannot obtain the original data of the sensitive data, thereby ensuring data isolation between different service nodes in the same region and further improving privacy and security of the sensitive data.

Figure 3:
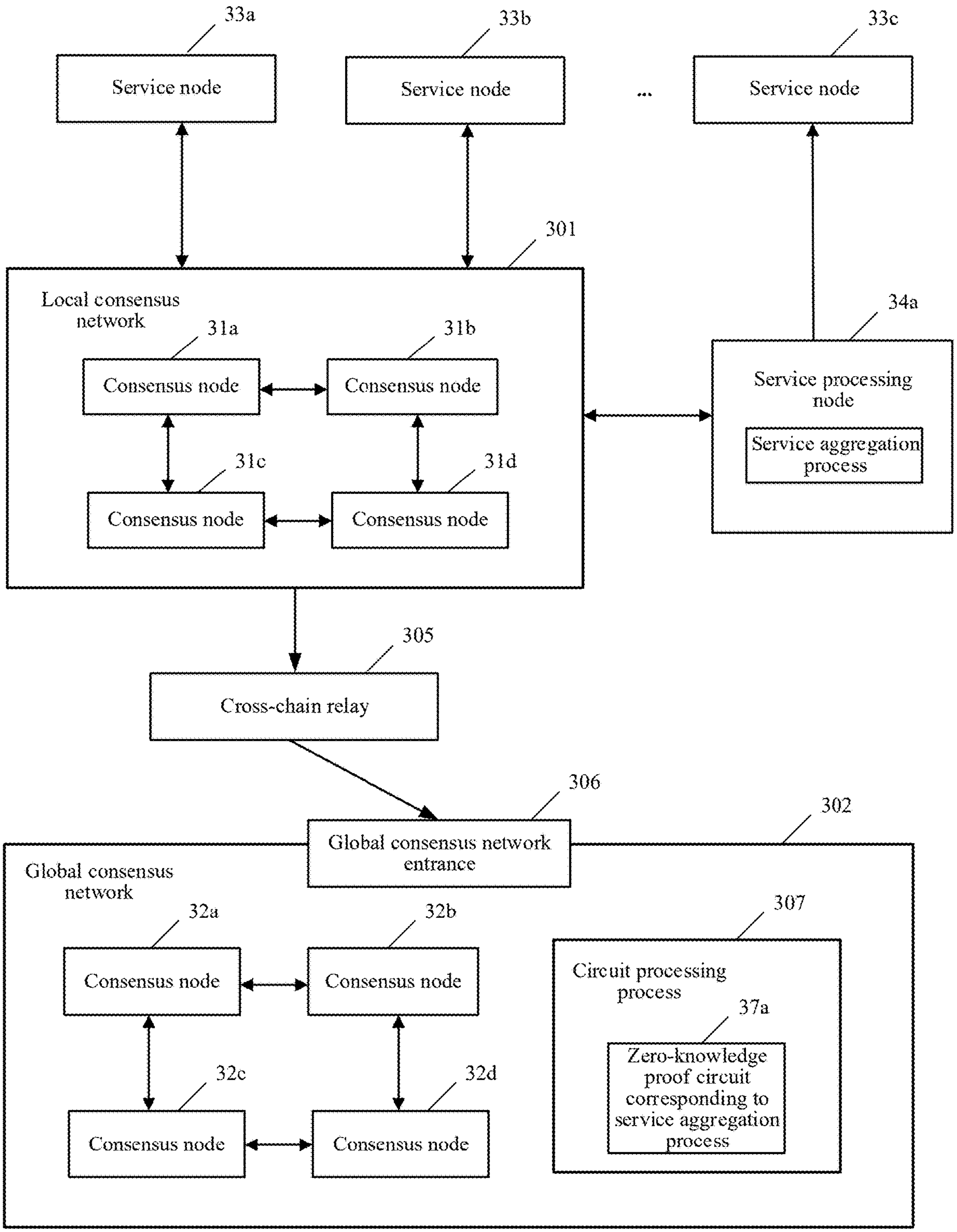
FIG. 3 is a schematic structural diagram of a hierarchical chain network provided with a service aggregation process according to an embodiment of this application.

Further, FIG. 3 is a schematic structural diagram of a hierarchical chain network provided with a service aggregation process according to an embodiment of this application. As shown in FIG. 3, the hierarchical chain network may include a global consensus network 302 and a local consensus network 301. The local consensus network 301 may be the local consensus network 201 in the embodiment corresponding to FIG. 2. The local consensus network 301 shown in FIG. 3 may include a plurality of local consensus nodes for maintaining local consensus sub-chains. The plurality of local consensus nodes may include, but are not limited to, a consensus node 31*a*, a consensus node 31*b*, a consensus node 31*c*, and a consensus node 31*d* shown in FIG. 3. Similarly, the global consensus network 302 can be the global consensus network 202 in the embodiment corresponding to FIG. 2. The global consensus network 302 shown in FIG. 3 may include multiple global consensus nodes for maintaining global consensus chains. The plurality of global consensus nodes may include, but are not limited to, a consensus node 32*a*, a consensus node 32*b*, a consensus node 32*c*, and a consensus node 32*d* shown in FIG. 3. The hierarchical chain network may further include multiple service nodes associated with the local consensus network. The plurality of service nodes may include, but are not limited to, a service node 33*a* (for example, a service SPV node 1), a service node 33*b* (for example, a service SPV node 2), and a service node 33*c* (for example, a service SPV node 3) shown in FIG. 3.

In addition to the local consensus node used for maintaining the local consensus sub-chain, the network used for processing a local service may further include a service processing node used for providing a service aggregation process. The service processing node may be a service processing node 34*a* shown in FIG. 3. One or more service aggregation processes may be started for the same local consensus network, and the one or more service aggregation processes may be run on one service processing node. In an embodiment, different service processing nodes may be deployed for different local consensus networks, and then different service aggregation processes for different local consensus networks may be deployed in different service processing nodes. For ease of understanding, in this embodiment, starting one service aggregation process for the same local consensus network is used as an example. In this case, the one service aggregation process is run on one service processing node located on the same network as the local consensus network.

The service processing node (for example, the service processing node 34*a*) may be configured to process the service related to sensitive data that is submitted in a plaintext form. That is, the sensitive data is essentially service data in the service (for example, the local service) that is submitted in the plaintext form. In this embodiment, local services related to sensitive data may be collectively referred to as a service or a sensitive service, and the sensitive service or sensitive data in the service may be collectively referred to as target data. The target data may be specifically an object identification (that is, an identification used to uniquely represent a user) of a service object (for example, a user), personnel information of an enterprise or an institution, customer information of an enterprise or an institution, or the like. This is not limited herein.

For example, the service or the sensitive service may be a tax refund service used for tax refund, the tax refund service may carry identification information of a service object that claims tax refund, and the identification information of the service object is the sensitive data. For another example, the service or the sensitive service may be a credibility service used for querying credibility information, the credibility service may carry identification information of a service object requiring credibility query, and the identification information of the service object is the sensitive data.

When a service aggregation process is deployed on the service processing node 34*a*, the service processing node 34*a* may invoke the service aggregation process to execute the service, and to further optimize data of a service execution result obtained by executing the service, so that sensitive data in the service is no longer transmitted to the local consensus node in a plaintext form. This can resolve the problem that the local consensus node uploads the sensitive data in the service to the local consensus sub-chain in a plaintext form, thereby ensuring privacy and security of the sensitive data. In addition, this can ensure that the related data linked to the local consensus sub-chain is optimized data. The data optimization (also referred to as desensitization) refers to hiding or blurring sensitive data, thereby avoiding leakage of the sensitive data and ensuring security and privacy of the sensitive data.

For example, the service aggregation process may be configured to process a tax refund service, the tax refund service may carry identification information of a service object requiring tax refund, and the identification information of the service object is sensitive data. In this case, when receiving the tax refund service, the service processing node may obtain a tax payment receipt from the global consensus chain or the local consensus sub-chain based on identification information of a service object in the tax refund service, and then perform tax refund processing based on the tax payment receipt. Then, after executing the tax refund service by using the service aggregation process, the service processing node may further optimize (for example, hide an object identification of a service object in the tax refund service), by using the service aggregation process, data (for example, a service execution result of the tax refund service) that needs to be returned to the local consensus node. Then, the optimized data is returned to the local consensus node in a service form, thereby ensuring privacy and security of the object identification of the service object.

One service related to sensitive data (also referred to as a sensitive service) may be processed by one service aggregation process, that is, each independent sensitive service may have a corresponding service logic and execution circuit, so that service isolation between sensitive services may be effectively implemented. If a plurality of types of sensitive services need to be processed, a plurality of service aggregation processes may be deployed in a network used for processing a local service. One of the service aggregation processes is used as an example for description herein. In addition, a global consistency capability of the hierarchical chain network can be ensured jointly by using a zero-knowledge proof circuit corresponding to a service aggregation process, a cross-chain backhaul capability of a local consensus sub-chain (for example, aggregation information may be sent to the global consensus network in a service form), and a global circuit management capability of the global consensus network (that is, a circuit processing process provided by a power processing process shown in FIG. 3). In addition, correctness of a sensitive service can be ensured on detrusted basis.

The service processing node may be deployed in a data service network, and the data service network may be independent of the global consensus network and the local consensus network, that is, the service processing node in the data service network belongs to neither the global consensus network nor the local consensus network.

In this embodiment, one service processing node may be deployed on one local consensus network. Therefore, a network formed by different service processing nodes may be the data service network. The data service network may include one or more service processing nodes.

In one embodiment, the service processing node deployed in the data service network may maintain a private chain. The private chain essentially refers to a distributed storage database implemented based on factors such as network balance. That is, the distributed storage database may be used for distributed storage of data obtained after optimizing sensitive data of private services in different regions. In other words, the private chain is essentially a data chain on which block consensus does not need to be reached. For example, when a quantity of received services is N, the service processing node may perform service aggregation on the N services, to aggregate and package the N services into a block (that is, an aggregation block), invoke a service aggregation process to perform a service in the block (that is, the aggregation block), and then may store, into a data chain maintained by the service processing node, the block obtained through packaging (that is, the aggregation block).

The service aggregation process may be a service process that has been registered and examined on the global consensus chain. Because calculation logic corresponding to the service aggregation process needs to be kept private before each service aggregation process is started, the calculation logic is not disclosed in the entire network. However, the service aggregation process needs to be registered and examined on the global consensus node in the global consensus network. Accordingly, after the service aggregation process is registered and examined on the global consensus node, a circuit processing process shown in FIG. 3 may be invoked to store a zero-knowledge proof circuit corresponding to the service aggregation process. This means that this embodiment can ensure that the service aggregation process is managed by the global consensus network, and therefore ensure security and reliability of the service aggregation process registered on the global consensus chain based on a global consensus protocol run by these global consensus nodes in the global consensus network, thereby avoiding creation and starting of a malicious service aggregation process.

The global consensus network may invoke the circuit processing process 307 to store a zero-knowledge proof circuit corresponding to the service aggregation process that has been registered and examined, for example, store the zero-knowledge proof circuit 37*a* corresponding to the service aggregation process shown in FIG. 3. Then, when another service object raises a question about execution logic of the service aggregation process, the global consensus node may invoke the circuit processing process 307 to obtain the zero-knowledge proof circuit 37*a* corresponding to the service aggregation process, and then return the obtained zero-knowledge proof circuit 37*a* to the another service object raising the question, so that the another service object raising the question performs verification.

When the service processing node starts the service aggregation process, the local consensus node in the local consensus network may verify whether the service aggregation process is registered and examined on the global consensus chain. If verifying that the to-be-started service aggregation process is registered and examined on the global consensus chain, the service processing node may be allowed (that is, authorized) to start the service aggregation process. If verifying that the to-be-started service aggregation process is not registered and examined on the global consensus chain, the service processing node is not allowed to start the service aggregation process.

The service aggregation process is a self-organizing block architecture, and consensus does not need to be reached on a block obtained through packaging by the service aggregation process. This means that correct execution of a block obtained through packaging by the service aggregation process and a service are ensured by using the zero-knowledge proof circuit. The zero-knowledge proof circuit includes a zero-knowledge proof execution circuit and a zero-knowledge proof desensitization circuit. For example, in this embodiment, when a block obtained through packaging is provided to the zero-knowledge proof execution circuit, the zero-knowledge proof execution circuit may execute the block and each service in the block, and then may record a service execution proof obtained after the block is executed and a service execution result of each service obtained after each service is executed. The service execution result of each service may be equivalent to the block execution result of the block. Further, in this embodiment, the block execution result of the block may be further provided to the zero-knowledge proof desensitization circuit, and then the zero-knowledge proof desensitization circuit may desensitize (that is, optimize) the block execution result of the block, to obtain a block optimization result (which may also be referred to as a block desensitization processing result) and an optimization proof that correspond to the block execution result. The desensitization (that is, optimization) refers to blurring or hiding sensitive data in a plaintext form in the block execution result. In this embodiment, the service execution proof and the optimization proof are both zero-knowledge proofs (that is, ZK proofs).

The zero-knowledge proof (that is, the ZK proof) uses cryptography to allow a person (a prover) to prove to another person (a verifier) that a fact is absolutely real, but does not disclose any additional information other than a statement about particular authenticity. That is, the ZK proof is essentially for a person to prove that the person knows or owns something, but does not leak any information about what the person knows or owns. Currently, the ZK proof has two main functions: 1. Privacy is ensured, that is, a public data volume is reduced to the greatest extent when an activity is performed on a blockchain. For example, a service related to Zcash (a digital collection) needs to be issued to a public blockchain, but Zcash provides options of a confidential service and financial privacy. Therefore, a zero-knowledge proof may be used to allow the service to be verified without leaking a sender, a receiver, or a service amount. 2. Scalability guarantee: intensive calculation is allowed off the chain. This makes costs lower. Then, a brief proof is created, to indicate that the calculation is honest performed and may be published on the chain. On-chain functions and off-chain functions are respectively performed and become specialized. Further, a centralized and high-performance off-chain system may be used to quickly and effectively process a large quantity of services, and then a decentralized, invariable, and detrusted blockchain is used as a final fact source for recording who owns what. The ZK proof has a very small calculation amount and has a very high verification speed relative to validity proofs of all off-chain services. This is due to an almost magic attribute: Once a proof "yes, billions of calculations are 100% proved to be correct" is created, a verifier may confirm that the proof is correct, and does not need to perform another billions of calculations.

After the local consensus network writes, into the local consensus sub-chain, the backhaul service backhauled by the service processing node by using the service aggregation process, the local consensus node (for example, the consensus node 31*a*) may further perform information aggregation on an optimized service execution result of a service within a particular time, perform, according to a service encapsulation format, information encapsulation on aggregation information obtained through aggregation, to obtain an aggregation service through encapsulation, and upload the aggregation service to the global consensus node by using the cross-chain relay 305 shown in FIG. 3.

Specifically, when the local consensus node (for example, the consensus node 31*a*) obtains the aggregation service, the local consensus node may send the aggregation service to the global consensus network entrance 306 by using the cross-chain relay 305, then the global consensus network entrance 306 may forward the aggregation service to the global consensus network 302, and then the global consensus node (for example, the consensus node 32*a*) in the global consensus network writes the aggregation service to the global consensus chain.

Based on the foregoing descriptions, an embodiment of this application provides a data processing solution based on a hierarchical chain. In a basic infrastructure of a hierarchical chain network (a global consensus network and a local consensus network), a service aggregation process can be deployed for the local consensus network, then a service processing node invokes the service aggregation process to execute N services in a block to be processed, to obtain N service execution results and a service execution proof that correspond to the N services, and then invokes the service aggregation process to optimize a block execution result determined based on the N service execution results, to obtain a block optimization result and an optimization proof, and then obtain a backhaul service to be backhauled to the local consensus node. In addition, the backhaul service is backhauled to the local consensus node, so that data backhauled to the local consensus node is obtained after optimizing a corresponding service execution result in the block execution result. Accordingly, privacy and security of service data in the backhaul service linked to the local consensus sub-chain can be ensured. In addition, the target data processing solution relies on the hierarchical chain network, and each region may correspond to one network used for processing a local service, thereby ensuring service isolation between local services of different regions. In addition, because the service aggregation process deployed on the service processing node is registered and examined on the global consensus node, the global consensus protocol on the global consensus node may be used to ensure security and reliability of the service aggregation process linked to the global consensus chain.

The nodes (for example, the service processing node, the local consensus node, and the global consensus node) in this embodiment may be a server, a terminal device, or another data processing device. This is not limited herein. The server may be an independent physical server, may be a server cluster or a distributed system including a plurality of physical servers, or may be a cloud server providing basic cloud computing services such as a cloud service, a cloud database, cloud computing, a cloud function, cloud storage, a network service, cloud communication, a middleware service, a domain name service, a security service, a CDN, and big data and artificial intelligence platforms. This is not limited herein. The terminal device includes but is not limited to a mobile phone, a computer, an intelligent voice interaction device, a smart home appliance, an in-vehicle terminal, an aircraft, a smart speaker, a smart home appliance, and the like.

In this embodiment, a node can display a prompt interface or a pop-up window when obtaining data (for example, the foregoing object identification, enterprise personnel information, or enterprise customer information) of a service object (for example, the foregoing individual, enterprise, or institution). The prompt interface or the pop-up window is used to indicate to the service object that data such as object identification, enterprise personnel information, and enterprise customer information are to be collected. Only after obtaining a confirmation operation of the service object on the prompt interface or the pop-up window, related operations of obtaining data may be executed. Otherwise, the process ends.

In addition, in some embodiments, service data (for example, data such as the tax payment receipt for tax refund in the tax refund service or the credibility information in the credibility query service) of a service object, such as a user, an enterprise, and an institution, may be involved. When the foregoing embodiments of this application are applied to a specific product or technology, a permission or an approval from a service object, such as a user, an enterprise, and an institution, needs to be obtained. In addition, collection, use, and processing of relevant data need to comply with relevant laws, regulations, and standards of relevant regions.

Figure 4:
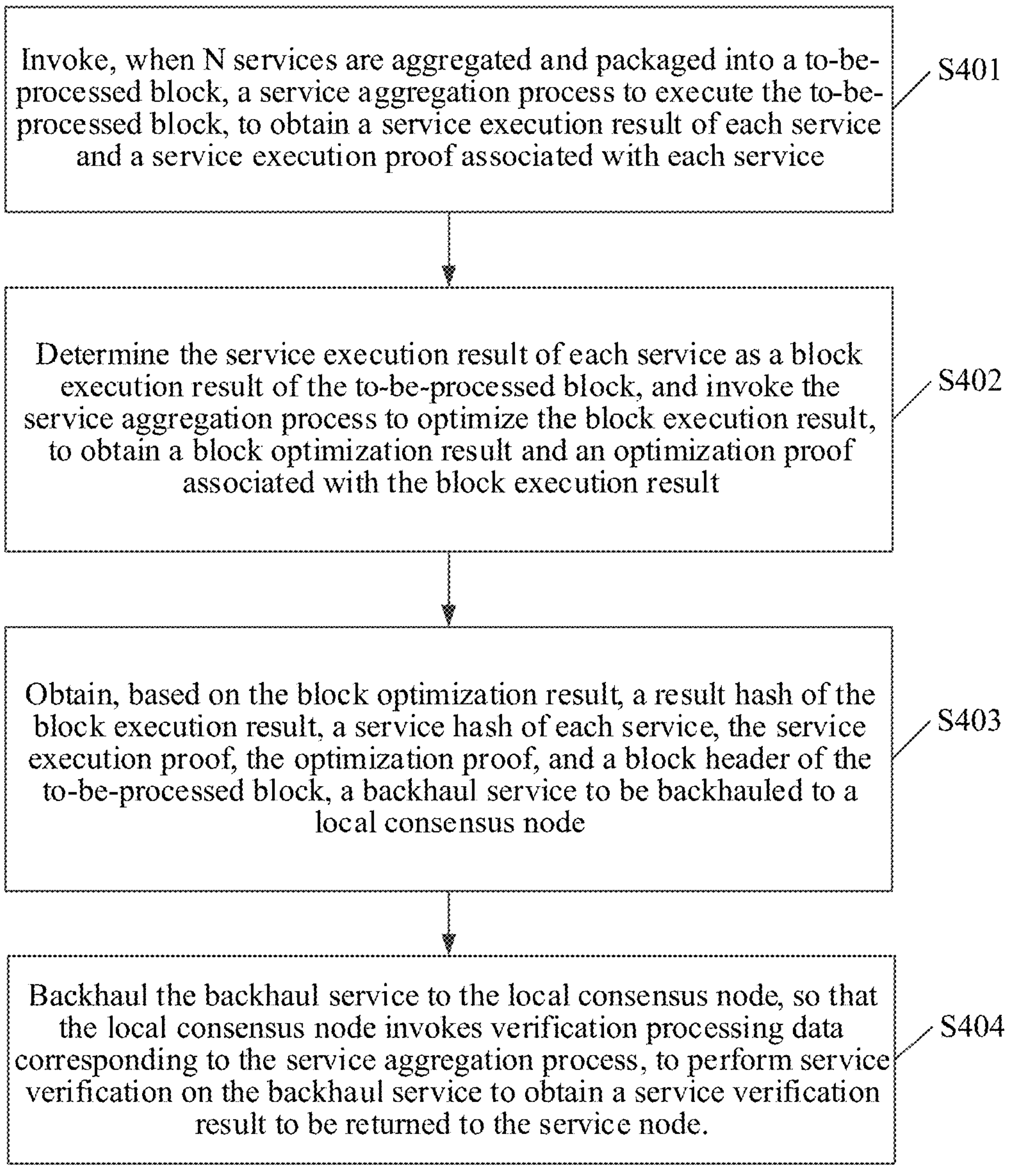
FIG. 4 is a schematic flowchart of a data processing method based on a hierarchical chain according to an embodiment of this application.

Further, FIG. 4 is a schematic flowchart of a data processing method based on a hierarchical chain according to an embodiment of this application. A hierarchical chain network corresponding to the hierarchical chain includes a local consensus network deployed in a service layer and a global consensus network deployed in a consensus layer, a local consensus node and a service processing node are deployed in the service layer, the local consensus node is a consensus node in the local consensus network, the global consensus node deployed in the consensus layer is a consensus node in the global consensus network, and the local consensus node is configured to: when determining that the service aggregation process of the service processing node has been registered and examined on the global consensus node, authorize the service processing node to start the service aggregation process. The method is performed by the service processing node starting the service aggregation process. In other words, starting of the service aggregation process corresponding to the service processing node is determined by both the local consensus node in the local consensus network and the global consensus node in the global consensus network. The data processing method based on a hierarchical chain may include operation S401 to operation S404.

S401: Invoke, when N services are aggregated and packaged into a block to be processed, the service aggregation process to execute the block to be processed, to obtain a service execution result of each service and a service execution proof associated with each service.

N is a positive integer, each service is a local service that carries sensitive data and that is transmitted by a service node associated with the local consensus node, and the service execution result of each service is recorded when each service in the block to be processed is executed. In other words, in this embodiment, a service is sent by the service node associated with the local consensus node. One service may correspond to one service execution result.

The block to be processed may be obtained by performing block packaging on currently obtained N services. This means that the foregoing aggregation and packaging refers to an operation of invoking, by the service processing node, the service aggregation process to package the N services into one block (that is, the block to be processed). As described above, the service may be a sensitive service that carries target data (that is, the foregoing sensitive data) and that is submitted by a service node located in the same region as the service processing node and received by the service processing node. The sensitive service is essentially the foregoing local service. For example, the service may be a tax refund service for tax refund of a service object. One service aggregation process may be configured to process one type of sensitive service (that is, configured to process one type of service). If a plurality of types of services need to be processed, a plurality of service aggregation processes associated with a local consensus network in a region may be deployed in a network used for processing a local service. One of the service aggregation processes is used as an example for description herein.

In this embodiment, the block to be processed including the N services may be specifically obtained after performing, when a service pool corresponding to a data chain maintained by the service processing node reaches a service packaging condition, block packaging on the to-be-processed N services in the service pool. The service pool may be used for storing each service that is received by the service processing node and is to be processed (that is, subject to privacy processing). That is, each time the service processing node receives each service, the service processing node may store each service into the service pool, and then when the service pool reaches the service packaging condition, the service processing node obtains, from the service pool, the N services that exist when the service packaging condition is triggered, and aggregates and packages the obtained N services into the block to be processed. The service packaging condition may be that a timestamp corresponding to the service pool reaches a time threshold, or may be that a quantity of to-be-processed services in the service pool reaches a quantity threshold. This is not limited herein. For example, service packaging processing may be performed on a service in the service pool once every 10 minutes. In this case, when the timestamp corresponding to the service pool reaches a time interval of 10 minutes from service packaging processing of the last time, the service pool reaches the service packaging condition. In this case, the service pool includes N services, and service packaging processing may be performed on the N services, to obtain the block to be processed. For another example, when a quantity of services in the service pool reaches N, service packaging processing may be performed on a service in the service pool once. In this case, when the quantity of services in the service pool reaches N, the service pool reaches the service packaging condition. In this case, service packaging processing may be performed on the N services in the service pool, to obtain the block to be processed.

The service node may be a collective name of nodes for initiating services (for example, the private service that carries sensitive data and the local service or the global service that does not carry sensitive data). Among the N services in the block to be processed, each service may be initiated by one service node, or one or more services may be initiated by one service node. A quantity of services submitted by each service node to the service processing node is not limited herein. A service node associated with a local consensus node may be a service node belonging to a region in which a corresponding local consensus network is located. For example, a local consensus network of a local consensus node is used for processing a service of a region A. In this case, a service node associated with the local consensus node may be a service node in the region A.

The N services may include a service (for example, the second service) directly sent by the service node to the service processing node, or may include a service (for example, the first service) sent by the service node to the local consensus node and then forwarded by the local consensus node to the service processing node.

Specifically, the service node includes a first service node deployed in the hierarchical chain network, and a service sent by the first service node to the local consensus node is a first service. In this case, this embodiment includes: receiving the first service forwarded by the local consensus node, and using the first service as a service of the N services; where a service type corresponding to the first service is consistency with a service type of each of the N services.

The first service node may be any service node in the hierarchical chain network, and the first service node may send a service to a corresponding local consensus node. In other words, the first service node is a node that is in a service network of the hierarchical chain network and that is configured to transmit a service to the local consensus node, and the service transmitted by the first service node to the local consensus node is the first service.

As can be seen, the first service may be a service sent by the first service node to the local consensus node and forwarded by the local consensus node to the service processing node. Then, the service processing node may receive the first service forwarded by the local consensus node, and use the first service as one of the N services. That is, the service processing node may place, into the service pool, the received first service forwarded by the local consensus node, and then when the service pool reaches a service packaging condition, may determine the N services based on the first service and another service in the service pool, to perform service packaging processing on the N services to obtain the block to be processed.

The service aggregation process may be configured to process the sensitive service. In this case, service types of sensitive services received by the service processing node on which the service aggregation process is deployed are the same (for example, the sensitive service type for tax refund). For example, the N services in the block to be processed may be of the same service type, that is, the service type of the first service is consistency with a service type of each of the N services.

In some embodiments, the service node may further include a second service node deployed in the hierarchical chain network. The second service node is a node that is in a service network of the hierarchical chain network and that is configured to directly transmit a service to the service processing node. In this case, this embodiment further includes: receiving, by the service processing node, a second service transmitted by the second service node, and using the received second service as a service of the N services; where a service type corresponding to the second service is consistency with a service type of each of the N services.

The second service node may be any service node in the hierarchical chain network, and the second service node may be a service node that directly sends a service to the service aggregation process. The second service node and the first service node may be the same service node or different service nodes in the service network. This is not limited herein.

The second service may be a service directly sent by the second service node to the service processing node. That is, the service processing node may receive the second service directly sent by the second service node, and use the second service as one of the N services. That is, the service processing node may place, into the service pool, the received second service directly sent by the second service node, and when the service pool reaches a service packaging condition, may determine the N services based on the second service and another service in the service pool, to perform service packaging processing on the N services to obtain the block to be processed.

As described above, that the service processing node invokes the service aggregation process to achieve correct service execution and optimization of a service execution result is ensured by using a zero-knowledge proof circuit. The zero-knowledge proof circuit may be configured to execute N services in a block to be processed, to obtain a service execution result of each service, then use a block as a unit to collectively refer to obtained service execution results of the services as a block execution result of the block to be processed, then optimize data of the service execution result of each service in the block execution result when optimizing the block execution result of the block to be processed, to obtain a service execution result of each service after data optimization, and then use the service execution result of each service after data optimization as a block optimization result, to optimize the block execution result of the block to be processed. In this embodiment, optimized block execution results may be collectively referred to as a block optimization result.

The zero-knowledge proof is a proof idea of cryptography. A prover (that is, the service processing node) and a verifier (that is, the local consensus node) negotiate a rule together. According to the rule, the prover provides a string of ciphertext (that is, a circuit proof generated based on the zero-knowledge proof circuit) to the verifier without leaking a private evidence of the prover. The verifier may perform verification on the ciphertext, and may confirm that the prover has corresponding proof content when the verification succeeds, but the verifier cannot know specific proof content thereof. That is, the circuit proof generated based on the zero-knowledge proof circuit can make the verifier believe that the prover has a capability of correctly executing a service and optimizing a service execution result of the service, but the verifier does not need to know specific implementation of the prover.

The zero-knowledge proof circuit corresponding to the service aggregation process may include a zero-knowledge proof execution circuit and a zero-knowledge proof optimization circuit. The zero-knowledge proof execution circuit may be configured to execute N services in the block to be processed, to obtain service execution results and service execution proofs of the N services. The zero-knowledge proof optimization circuit may be configured to optimize a block execution result determined based on the N service execution results, to obtain a block optimization result and an optimization proof.

The service execution result of each service is recorded when the service aggregation process is invoked to execute each service. One service may correspond to one service execution result.

The service execution proof may be a proof used to indicate that each of N services is correctly executed, that is, in related descriptions of the zero-knowledge proof, a prover needs to provide a string of ciphertext for verification to a verifier, so that the verifier (that is, a local consensus node) may subsequently verify, by using the service execution proof without knowing a specific execution process of the service, whether the service is correctly executed.

Specifically, the service processing node may invoke the service aggregation process to execute N services in the block to be processed, to obtain N service execution results corresponding to the N services and service execution proofs associated with the N services. For example, the service processing node may obtain, from a zero-knowledge proof circuit corresponding to the service aggregation process, a zero-knowledge proof execution circuit associated with the block to be processed, and invoke the zero-knowledge proof execution circuit to execute the N services in the block to be processed, to obtain the N service execution results corresponding to the N services and the service execution proofs associated with the N services.

The zero-knowledge proof execution circuit may be configured to execute the N services in the block to be processed, to obtain a service execution result of each of the N services, and may generate a service execution proof associated with each service. That is, the service execution proof may be a proof used to indicate correct execution of each service.

For example, the service aggregation process may be configured to process the foregoing tax refund service. That is, the tax refund service received by the service processing node may include some sensitive data. The sensitive data includes but is not limited to: object information (for example, an object identification) of a service object requiring tax refund. Then, when performing the tax refund service by using the service aggregation process, the service processing node may perform tax refund service processing for the service object based on the object information of the service object. For example, the service processing node may obtain a tax payment receipt of the service object from a global consensus chain or a local consensus sub-chain based on the object information of the service object, and then perform tax refund processing based on the tax payment receipt of the service object, to obtain a service execution result recorded by executing the tax refund service. In this case, the service execution result may include information such as whether tax refund of the service object succeeds, a tax refund amount, and a tax refund time. The service execution result may also involve sensitive data (for example, the object information of the service object). Therefore, the service processing node further needs to optimize the sensitive data in the service execution result, to obtain an optimized service execution result of the tax refund service.

When the service object initiates the sensitive service, that is, the tax refund service, the object information (for example, the object identification) of the service object needs to be obtained. A prompt interface or a pop-up window may be displayed to prompt the service object that the object identification of the service object is to be collected. Only after a confirmation operation of the service object on the prompt interface or the pop-up window is obtained, related operations of obtaining data start to be performed. Otherwise, the process ends. In addition, for a tax refund proof that needs to be obtained in a process of processing the tax refund service, permission or consent of a service object such as a user, an enterprise, or an institution also needs to be obtained, and collection, use, and processing of related data need to comply with related laws and regulations and standards in a related region.

S402: Determine the service execution result of each service as a block execution result of the block to be processed, and invoke the service aggregation process to optimize the block execution result, to obtain a block optimization result and an optimization proof associated with the block execution result.

The optimization refers to hiding or blurring the sensitive data in the service execution result of each service, the block optimization result refers to an optimized block execution result, and the optimization proof is an evidence for indicating that the block execution result is optimized. In other words, the optimization proof may be specifically a proof that is provided to a verifier (that is, a local consensus node on which verification processing data is deployed) and that can indicate that the block execution result is optimized.

The block execution result may be an execution result corresponding to the block to be processed, and the block execution result may include N service execution results.

Optimizing the block execution result may be hiding or blurring target data (that is, the sensitive data, for example, the object identification of the service object) in the block execution result, to obtain a block optimization result. For ease of description, a block execution result obtained after optimization may be referred to as a block optimization result. For example, if the service execution result of each service in the block execution result includes sensitive data (for example, an object identification of a service object corresponding to the corresponding service), the service aggregation process may be further invoked to optimize the sensitive data (for example, the object identification of the service object) in each service execution result, that is, a key character in the object identification of the service object may be hidden. For example, the object identification of the service object is 12345, and the key character in the object identification of the service object is hidden by using "*". In this case, the object identification of the service object obtained after the data optimization is 123**. Accordingly, the sensitive data in the service execution result of each service in the block execution result is optimized. Then, the optimized service execution results of the services may be collectively referred to as the block optimization result.

The optimization proof may be a proof used to indicate that the block execution result is optimized, that is, a string of ciphertext for verification that a prover needs to provide to a verifier in related descriptions of the zero-knowledge proof. Then, the verifier (that is, the local consensus node) may subsequently verify, by using the optimization proof while not knowing a specific optimization process, whether the block execution result is correctly optimized.

Specifically, the service processing node may invoke the service aggregation process to optimize a block execution result, to obtain a block optimization result and an optimization proof associated with the block execution result. For example, the service processing node may obtain, from the zero-knowledge proof circuit corresponding to the service aggregation process, the zero-knowledge proof optimization circuit associated with the block execution result, and invoke the zero-knowledge proof optimization circuit to optimize the block execution result, to obtain the block optimization result and the optimization proof associated with the block execution result.

The zero-knowledge proof optimization circuit may be configured to optimize a block execution result to obtain a block optimization result, and the zero-knowledge proof optimization circuit may further generate an optimization proof that is provided to the local consensus node and that can verify whether the block execution result is correctly optimized.

S403: Obtain, based on the block optimization result, a result hash of the block execution result, a service hash of each service, the service execution proof, the optimization proof, and a blockhead of the block to be processed, a backhaul service to be backhauled to the local consensus node.

The backhaul service may be a service to be backhauled to a verifier (that is, a local consensus node on which verification processing data is deployed). That is, when being backhauled to the local consensus node, the block optimization result, the circuit proof (that is, the service execution proof and the optimization proof), and other auxiliary proofs (that is, a result hash of the block execution result and service hashes of the N services) may be backhauled in a service form.

The result hash of the block execution result may be a hash value obtained by performing hash calculation on the block execution result. The service hash of each of the N services may be a hash value obtained by separately performing hash calculation on each service, that is, one service may correspond to one service hash. The blockhead of the block to be processed may include information such as a block hash value of the block to be processed, a block hash value of a previous block of the block to be processed on the data chain, and a timestamp. This is not limited herein. The block hash value of the block to be processed is a root hash value of the current block. The root hash value is a hash value finally obtained after hash calculation is performed on N services in a block body of the block to be processed.

The block optimization result, the result hash of the block execution result, the service hash of each service, the service execution proof, the optimization proof, and the blockhead of the block to be processed may be used as service parameters in the backhaul service, and then service encapsulation may be further performed on these service parameters in the backhaul service based on a service encapsulation format associated with the local consensus network, to obtain, through encapsulation, the backhaul service to be backhauled to the local consensus node.

Figure 5:
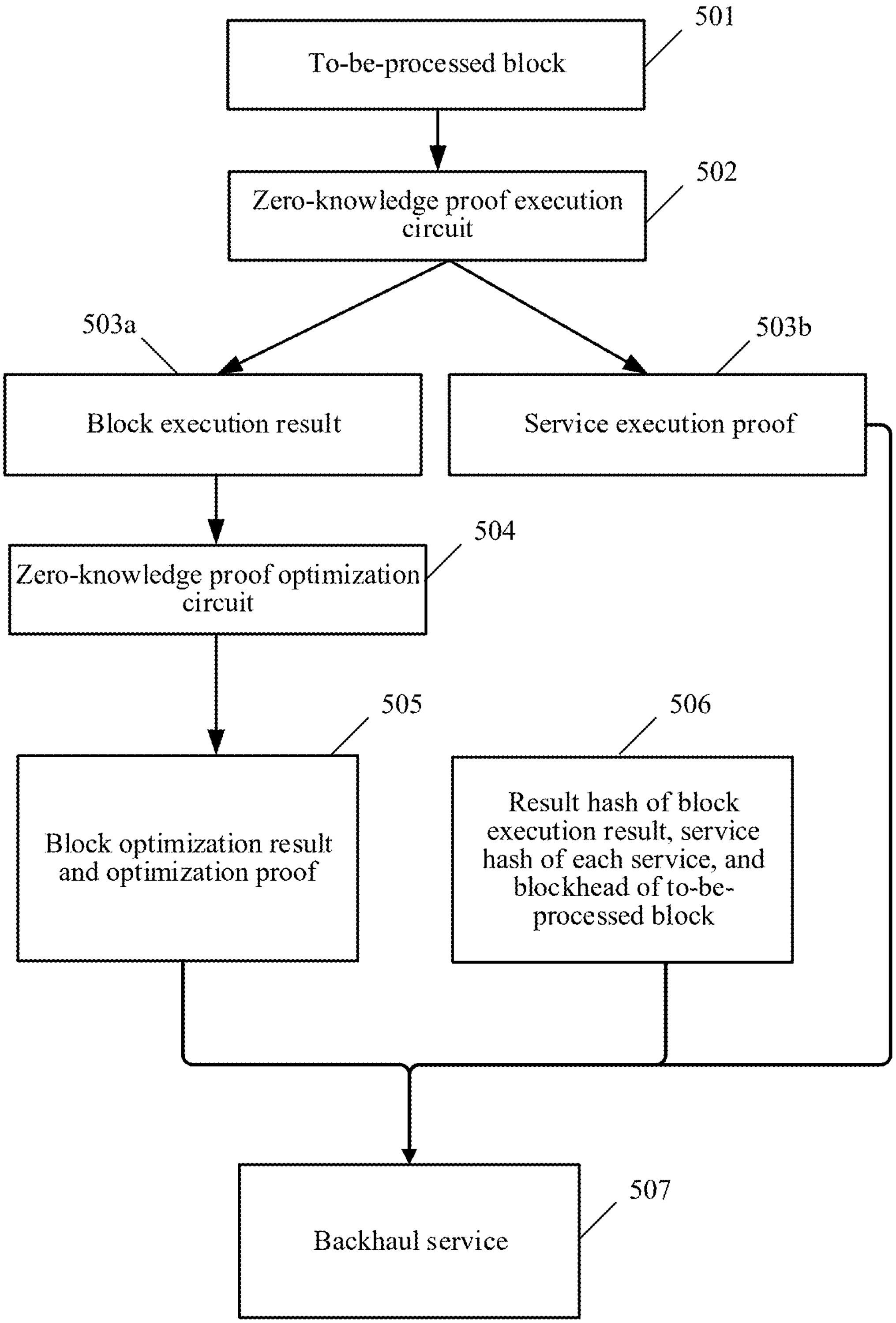
FIG. 5 is a schematic flowchart of obtaining a backhaul service according to an embodiment of this application.

Further, FIG. 5 is a schematic flowchart of obtaining a backhaul service according to an embodiment of this application. As shown in FIG. 5, the block to be processed obtained by the service processing node may be a block to be processed 501 shown in FIG. 5. The block to be processed 501 may include the N services. Further, as shown in FIG. 5, the service processing node may invoke a zero-knowledge proof execution circuit 502 to execute the block to be processed 501, to obtain a block execution result 503*a* and a service execution proof 503*b* of the block to be processed 501 by using a block as a unit. The block execution result 503*a* may be determined by the service processing node based on a service execution result of each of the N services.

Further, as shown in FIG. 5, the service processing node may input the block execution result 503*a* to a zero-knowledge proof optimization circuit 504, to invoke the zero-knowledge proof optimization circuit 504 to optimize the block execution result 503*a* (which specifically refers to that the zero-knowledge proof optimization circuit 504 may be invoked to optimize data of each service execution result in the block execution result 503*a*), to obtain a block optimization result and an optimization proof 505 shown in FIG. 5. In addition, other information that needs to be backhauled to the local consensus node, that is, a result hash of the block execution result, a service hash of each service, and a blockhead 506 of the block to be processed may be obtained. Then, a backhaul service 507 shown in FIG. 5 may be constructed based on the block optimization result, the optimization proof 505, the service execution proof 503*b*, the result hash of the block execution result, the service hash of each service, and the blockhead 506 of the block to be processed.

S404: Backhaul the backhaul service to the local consensus node, so that the local consensus node invokes verification processing data corresponding to the service aggregation process, to perform service verification on the backhaul service to obtain a service verification result to be returned to the service node.

The local consensus node may perform service verification on the backhaul service, that is, verify whether the block optimization result (that is, the optimized block execution result) carried in a service parameter in the backhaul service is a result obtained by correctly executing each service and optimizing data of each service execution result in the block execution result. With reference to the foregoing description, the local consensus node is equivalent to a verifier in the zero-knowledge proof, and performs service verification on the backhaul service, that is, performs verification based on a circuit proof (that is, a service execution proof and an optimization proof) in the backhaul service, to determine that the block optimization result of the backhaul service is obtained by correct execution and optimization. In other words, in this embodiment, the service verification refers to verifying, by using a circuit proof in the backhaul service, that the block optimization result is obtained through correct execution and optimization, and the circuit proof includes the service execution proof and the optimization proof.

The verification processing data may be a smart contract used for performing service verification on the backhaul service. The verification processing data is deployed on a local consensus sub-chain maintained by the local consensus node, so that the local consensus node may invoke the verification processing data to perform service verification on the backhaul service. The service verification result may be a result obtained by performing service verification on the backhaul service, that is, may be used to indicate that verification of the backhaul service succeeds or fails.

After the service verification result is obtained, the service verification result may be returned to a service node sending a corresponding service, so that the service node learns whether the service execution result of the service is successfully verified by the local consensus node.

When the service is a service (that is, the second service) directly sent by a service node to the service processing node, the service processing node may further directly return the service execution result of the second service to the corresponding service node (that is, the second service node). This is because when it is configured that the service (for example, the second service) may be directly sent by the service node to the service processing node, secure communication may be established between the service node and the service processing node, and the service node may directly obtain the service execution result of the second service. The service execution result of the second service is recorded when the second service in the block to be processed is executed.

As can be seen, the service processing node may directly return the service execution result of the second service to the second service node, or the service processing node may directly return the service execution result (that is, the optimized service execution result of the second service) that corresponds to the second service and that is obtained after data optimization to the second service node, or the service processing node may directly return the service execution result of the second service and the service execution result (that is, the optimized service execution result) that corresponds to the second service and that is obtained after data optimization to the second service node. This is not limited herein. An occasion of directly returning the service execution result of the second service to the second service node may be after the block execution result is obtained, or may be after the block optimization result is obtained. This is not limited herein. For example, an occasion when the service processing node returns the service execution result (that is, the optimized service execution result) that corresponds to the second service and that is obtained after data optimization to the second service node may be after the block optimization result is obtained.

Specifically, the block execution result includes a service execution result of the second service; and the service execution result of the second service is recorded when the second service in the block to be processed is executed. In this case, this embodiment further includes: the service processing node may return the service execution result of the second service to the second service node.

As described above, the second service may be a service directly sent by the second service node to the service processing node. The block execution result may include a service execution result of each of the N services. The service execution result of each service is obtained by executing the corresponding service, for example, a second service execution result is obtained by executing the second service. The service processing node may return the service execution result of the second service to the second service node. This is because the second service is directly sent by the second service node to the service processing node. Therefore, the second service node knows the target data (that is, the sensitive data) related to the second service, and secure communication is established between the second service node and the service processing node. Therefore, the service execution result including the sensitive data may be directly returned to the second service node.

Specifically, the block optimization result includes an optimized service execution result of the second service; and the optimized service execution result of the second service is obtained after optimizing data of the service execution result of the second service during optimization of the block execution result. In this case, this embodiment further includes: the service processing node may return the optimized service execution result of the second service to the second service node.

Optimizing the block execution result may be optimizing data of each service execution result in the block execution result, to obtain an optimized service execution result corresponding to each service. The block optimization result may include the optimized service execution result corresponding to each service, and further, the optimized service execution result of each service may be returned to a corresponding service node.

The service processing node may be configured to maintain a data chain, and after invoking the service aggregation process to execute the block to be processed, write the executed block to be processed into the data chain.

Specifically, a data service network corresponding to the service processing node is independent of the global consensus network and the local consensus network; and a data chain corresponding to the data service network is constructed based on service types of the N services. In this case, this embodiment may further include: when obtaining the block optimization result, the service processing node uses the block to be processed as a target block to be linked to the data chain, and may further write the target block into the data chain based on a data linking policy indicated by the service aggregation process.

The data chain is constructed based on service types of the N services. That is, a service type of each service in each block on the data chain is service types of the N services. For example, the service processing node is configured to process a service of a type 1. In this case, service types of the N services in the block to be processed are all the type 1, and therefore, the service type of each service in each block on the data chain is the type 1.

The target block may be a block to be linked to the data chain. The data linking policy may be a policy that the target block is directly written into the data chain when it is determined, by using the zero-knowledge proof circuit in the service aggregation process, that each service is correctly executed. Different from writing a block into a blockchain based on a consensus mechanism, in this embodiment, block consensus is not reached on the target block to be written into the data chain. That is, the data linking policy corresponding to the service aggregation process means that the service processing node can ensure correct execution of the service by using a zero-knowledge proof circuit. This means that the service processing node may directly write the target block into the data chain.

The data service network may include only the service processing node, or the data service network may include the service processing node and another data backup node configured to perform backup processing on the data chain. If the data service network includes the data backup node, the service processing node may send the target block to the data backup node when using the block to be processed as the target block to be linked to the data chain, so that the data backup node performs block backup processing on the target block written to the data chain. Generally, the data service network is a lightweight network, that is, the data service network includes only a small quantity of nodes. For example, a quantity of nodes in the data service network may be less than a threshold.

Specifically, the data service network may include a service processing node and a data backup node. The data linking policy is used to indicate that the service processing node is a primary service node in the data service network, and the data linking policy is used to indicate that the data backup node is a secondary service node other than the service processing node in the data service network. The data backup node is configured to perform block backup processing on the target block written to the data chain. Accordingly, the service processing node may transmit the target block to the data backup node when the target block is written into the data chain, so that the data backup node performs block backup processing on the target block.

When the data service network includes the service processing node and the data backup node, the data service network may include one service processing node, and one or more data backup nodes. This is not limited herein.

The primary service node may be a main service node configured to invoke the service aggregation process. The processing processes such as performing service packaging on services to obtain the block to be processed, invoking the service aggregation process to execute services in the block to be processed, and optimizing a service execution result may all be implemented on the service processing node currently used as the primary service node. The secondary service node may be a secondary service node configured to invoke the service aggregation process, and is mainly configured to perform backup processing on the target block. The primary service node and the secondary service node in a data service network may be determined through negotiation in advance, or may be determined based on load statuses of the nodes. This is not limited herein.

In this embodiment, a hierarchical chain network corresponding to the hierarchical chain may include a local consensus network deployed in a service layer and a global consensus network deployed in a consensus layer, a local consensus node and a service processing node are deployed in the service layer, the local consensus node is a consensus node in the local consensus network, and the global consensus node deployed in the consensus layer is a consensus node in the global consensus network. In this embodiment, the local consensus node may be configured to: when determining that the service aggregation process of the service processing node has been registered and examined on the global consensus node, authorize the service processing node to start the service aggregation process. Accordingly, when the service aggregation process is started and run on the service processing node, the N services may be aggregated and packaged into one block by using the service aggregation process, and a block currently obtained through packaging may be referred to as a block to be processed. Service types of the N services may all be the same. Further, the service processing node may invoke the service aggregation process to execute the block to be processed (for example, the service aggregation process can be specifically invoked to execute each service in the block to be processed), to obtain a service execution result of each service and a service execution proof associated with each service, where N is a positive integer. Each service is a sensitive service that carries sensitive data and that is transmitted by a service node associated with the local consensus node, and the service execution proof may be specifically an evidence for indicating that each service is correctly executed. Further, the service processing node may determine the service execution result of each service as a block execution result of the block to be processed, and then invoke the service aggregation process to optimize the block execution result, to obtain a block optimization result and an optimization proof associated with the block execution result, and the optimization refers to hiding or blurring the sensitive data in the service execution result of each service. Based on this, the block optimization result is an optimized block execution result. The optimization proof may be specifically an evidence for indicating that the block execution result is optimized. Further, the service processing node may obtain, based on the block optimization result, a result hash of the block execution result, a service hash of each service, the service execution proof, the optimization proof, and a blockhead of the block to be processed, a backhaul service to be backhauled to the local consensus node. Further, the service processing node may backhaul the backhaul service to the local consensus node, so that the local consensus node invokes verification processing data corresponding to the service aggregation process, to perform service verification on the backhaul service to obtain a service verification result to be returned to the service node, the service verification refers to verifying, by using a circuit proof in the backhaul service, that the block optimization result is obtained through correct execution and optimization, and the circuit proof may specifically include the service execution proof and the optimization proof.

As can be seen, in this embodiment, the service aggregation process started and run in the service processing node may obtain a sensitive service that carries sensitive data and that is transmitted by any service node associated with the local consensus network, and when N services including the sensitive service are aggregated and packaged into a block to be processed, the service aggregation process may be further invoked to execute the block to be processed by using a block as a unit, to obtain a block execution result and a service execution proof of the block to be processed. Accordingly, when the block execution result of the block to be processed also includes the sensitive data that needs to be desensitized, the service aggregation process may be further invoked to optimize the block execution result by using a block as a unit, to obtain a block optimization result and an optimization proof. Then, when obtaining other auxiliary proofs (for example, the result hash of the block execution result, the service hash of each service, and the blockhead of the block to be processed), the service processing node may further construct, based on the block optimization result, the optimization proof, and the other auxiliary proofs (for example, the result hash of the block execution result, the service hash of each service, and the blockhead of the block to be processed), the backhaul service to be backhauled to the local consensus node. The service parameters in the backhaul service are all desensitized parameters. Accordingly, the local consensus node obtains a result hash of a block execution result obtained after desensitization the block execution result, instead of each service execution result including sensitive data in the block execution result. Similarly, the local consensus node obtains a desensitized service hash of a sensitive service, instead of the sensitive service including sensitive data. Accordingly, when the local consensus node subsequently links the backhaul service to the local consensus sub-chain, service privacy and security of the service linked to the local consensus sub-chain can also be ensured. In addition, when obtaining the backhaul service, the local consensus node directly invokes verification processing data corresponding to the service aggregation process, to perform service verification on the backhaul service. That is, only the circuit proof (for example, the service execution proof and the optimization proof) in the backhaul service needs to be used to verify whether the block optimization result obtained on the service processing node side is obtained through correct execution and optimization, and a specific execution process of executing a large quantity of services and a specific optimization process of optimizing data of a large quantity of service execution results do not need to be known. Accordingly, calculation overheads of executing a large quantity of services and calculation overheads of optimizing data of a large quantity of service execution results can be fundamentally reduced on the local consensus node side. Finally, in this embodiment, the local consensus node may further aggregate optimized service execution results of services within a particular time, and further upload information obtained through aggregation (that is, aggregation information) to the global consensus node in a transaction form, so that the global consensus node in the global consensus network may know a current aggregation status of the local consensus network for some local services without obtaining all service data in the local consensus network. Therefore, resource occupation and load of the global consensus node can be reduced while service privacy and security of the local services on the local consensus sub-chain can be ensured.

Figure 6:
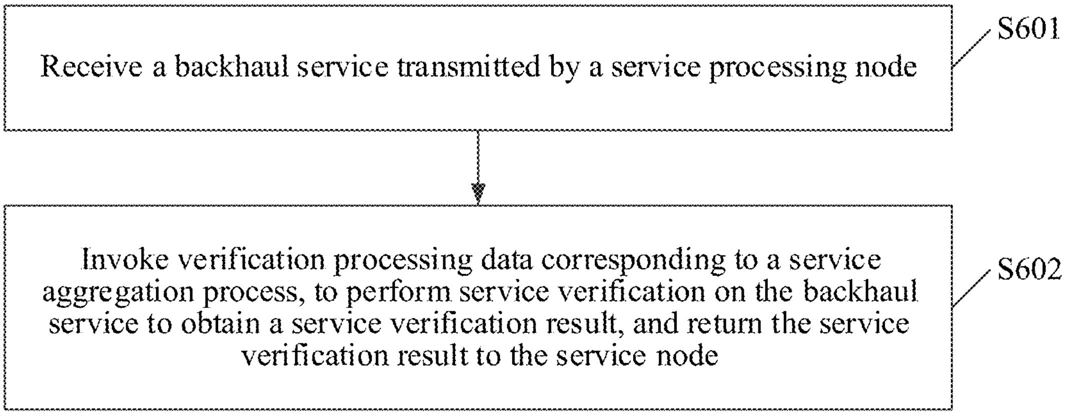
FIG. 6 is a schematic flowchart of a data processing method based on a hierarchical chain according to an embodiment of this application.

Based on the foregoing description, an embodiment of this application provides a data processing method based on a hierarchical chain. FIG. 6 is a schematic flowchart of a data processing method based on a hierarchical chain according to an embodiment of this application. A hierarchical chain network corresponding to the hierarchical chain includes a local consensus network deployed in a service layer and a global consensus network deployed in a consensus layer, a local consensus node and a service processing node is deployed in the service layer, the local consensus node is a consensus node in the local consensus network, the global consensus node deployed in the consensus layer is a consensus node in the global consensus network, and the local consensus node is configured to: when determining that the service aggregation process of the service processing node has been registered and examined on the global consensus node, authorize the service processing node to start the service aggregation process. The method is performed by a local consensus node. The data processing method based on a hierarchical chain may include operation S601 and operation S602.

S601: Receive a backhaul service transmitted by a service processing node.

The backhaul service is obtained by the service processing node based on a block optimization result, a result hash of a block execution result, a service hash of each of N services included in the block to be processed, a service execution proof, an optimization proof, and a blockhead of the block to be processed. Each service is a sensitive service that carries sensitive data and that is transmitted by a service node associated with the local consensus node, and the service execution proof is an evidence for indicating that each service is correctly executed, the block execution result is determined based on a service execution result of each service, a service execution result and a service execution proof of each service are obtained by the service processing node by invoking the service aggregation process to execute the block to be processed, and the block optimization result and the optimization proof are obtained by the service processing node by invoking the service aggregation process to optimize the block execution result.

For a manner of generating the backhaul service, refer to the foregoing related descriptions, and details are not described herein again.

As described above, a service of the N services may be the first service that is sent by the first service node to the local consensus node and then forwarded by the local consensus node to the service processing node, and then the local consensus node may subsequently return an optimized service execution result of the first service to the first service node.

Specifically, the service node includes a first service node deployed in the hierarchical chain network. In this case, this embodiment further includes: receiving a first service transmitted by the first service node, and forwarding the first service to the service processing node.

For related descriptions of the first service and the first service node, refer to the foregoing descriptions, and details are not described herein again.

As described above, when starting the service aggregation process corresponding to the service processing node, verification needs to be performed on the local consensus node, to verify whether the service aggregation process has been registered and examined in the global consensus network. If it is verified that the to-be-started service aggregation process is registered and examined in the global consensus network, the to-be-started service aggregation process may be allowed to be started. If it is verified that the to-be-started service aggregation process is not registered and examined in the global consensus network, the to-be-started service aggregation process is not allowed to be started.

Specifically, this embodiment may further include the following operations: invoking, when receiving a starting service of the service aggregation process corresponding to the service processing node, process verification processing data deployed in the local consensus sub-chain, to perform verification processing on the service aggregation process to obtain a verification processing result; and further, if the verification processing result indicates that the service aggregation process is a registered aggregation process that has been registered and examined in the global consensus network, deploying, in the local consensus sub-chain, verification processing data corresponding to the service aggregation process, and allowing the service processing node to start the service aggregation process.

The starting service may be a service used for starting the service aggregation process on the service processing node, and the starting service may be sent by a management node used for managing the service aggregation process. The process verification processing data may be a smart contract that is deployed on the local consensus sub-chain and that is used to manage the service aggregation process. For example, the process verification processing data may be used such that: when an object needs to start the service aggregation process on the service processing node, the local consensus node may determine, based on the starting service, whether the service aggregation process that currently needs to be started is a registered aggregation process that has been registered and examined on the global consensus chain, to implement verification of the service aggregation process. The registered aggregation process may be a service aggregation process that has been registered and examined in the global consensus network.

The verification processing result may be used to indicate that the service aggregation process is a registered aggregation process that has been registered and examined in the global consensus network, or the verification processing result may be used to indicate that the service aggregation process is not a registered aggregation process that has been registered and examined in the global consensus network. If the verification processing result is used to indicate that the service aggregation process is a registered aggregation process that has been registered and examined in the global consensus network, it indicates that the service aggregation process is registered and examined in the global consensus network. If the verification processing result is used to indicate that the service aggregation process is not a registered aggregation process that has been registered and examined in the global consensus network, it indicates that the service aggregation process is not registered and examined in the global consensus network.

The verification processing data is deployed for the service aggregation process whose verification succeeds (that is, it is verified that the service aggregation process is registered and examined in the global consensus network). In this embodiment, for different service aggregation processes, verification processing data corresponding to the different service aggregation processes may be deployed on the local consensus node. The service aggregation process can be successfully started only when the local consensus node allows (that is, authorizes) the service processing node to start the service aggregation process.

In an embodiment, if the verification processing result indicates that the service aggregation process is not a registered aggregation process that has been registered and examined in the global consensus network, the service processing node is not allowed to start the service aggregation process.

Specifically, before the invoking process verification processing data deployed in the local consensus sub-chain, to perform verification processing on the service aggregation process, this embodiment may further include the following operations: receiving aggregation service registration information obtained after the global consensus node registers and examines the service aggregation process; where the aggregation service registration information includes a service identification of the service aggregation process and circuit digest information of a zero-knowledge proof circuit corresponding to the service aggregation process; and further, writing the aggregation service registration information into the process verification processing data.

The aggregation service registration information may be information of the service aggregation process that has been registered and examined, for example, may include a service identification of the service aggregation process and circuit digest information of a zero-knowledge proof circuit corresponding to the service aggregation process. The service identification may be a unique identification of a service aggregation process, and one service identification corresponds to one service aggregation process. The circuit digest information of the zero-knowledge proof circuit may include circuit digest information of the zero-knowledge proof execution circuit and the zero-knowledge proof optimization circuit.

The global consensus node may receive a registration service for the service aggregation process, then the global consensus node may execute the registration service, that is, register and examine the service aggregation process indicated by the registration service, and then the global consensus node writes aggregation service registration information of the service aggregation process that has been registered and examined into the global consensus chain, and synchronizes the aggregation service registration information to the local consensus node, so that the local consensus node writes the aggregation service registration information into the process verification processing data.

When the process verification processing data is invoked to perform verification on the service aggregation process, if the aggregation service registration information of the service aggregation process is written into the process verification processing data, the service aggregation process may be successfully verified, that is, a verification processing result indicates that the service aggregation process is a registered aggregation process that has been registered and examined in the global consensus network. Otherwise, if the aggregation service registration information of the service aggregation process is not written into the process verification processing data, the service aggregation process is not successfully verified, that is, a verification processing result indicates that the service aggregation process is not a registered aggregation process that has been registered and examined in the global consensus network. Only when subsequently starting a service aggregation process that is registered and examined in the global consensus network (that is, registered in the circuit processing process), corresponding verification processing data can be deployed on the local consensus sub-chain, and a corresponding backhaul service can be verified in the local consensus network.

The global consensus network may be configured to register and examine the service aggregation process, and the global consensus network may store, in the circuit processing process, a zero-knowledge proof circuit corresponding to the registered and examined service aggregation process. Further, if an object questions a service execution result that is successfully verified by the local consensus node (that is, questions reliability of the zero-knowledge proof circuit corresponding to the service aggregation process), the local consensus node may obtain a corresponding zero-knowledge proof circuit from a circuit processing process on the global consensus node, so that the object questioning the service execution result may obtain the zero-knowledge proof circuit, to verify again the service execution result that is successfully verified on the local consensus sub-chain.

S602: Invoke verification processing data corresponding to the service aggregation process, to perform service verification on the backhaul service to obtain a service verification result, and return the service verification result to the service node.

The service verification refers to verifying, by using a circuit proof in the backhaul service, that the block optimization result is obtained through correct execution and optimization, and the circuit proof includes the service execution proof and the optimization proof.

As described above, the verification processing data may be a smart contract used for performing service verification on the backhaul service. The verification processing data is deployed on a local consensus sub-chain maintained by the local consensus node, so that the local consensus node may invoke the verification processing data to perform service verification on the backhaul service. The service verification result may be a result obtained by performing service verification on the backhaul service, that is, may be used to indicate that verification of the backhaul service succeeds or fails.

When receiving the backhaul service, the local consensus node may store the backhaul service in a local service pool corresponding to the local consensus sub-chain, use the backhaul service as a local service, then when the local service pool reaches a service packaging condition corresponding to the local service pool (for example, a timestamp corresponding to the local service pool reaches a time threshold, or a quantity of to-be-processed services in the local service pool reaches a quantity threshold), perform service packaging processing on local service in the local service pool to obtain a corresponding block, then perform block consensus on the local service in the block, and when block consensus is reached, may write the block including the local service into the local consensus sub-chain. Executing the backhaul service is invoking the verification processing data to verify the backhaul service.

Specifically, the invoking verification processing data corresponding to the service aggregation process, to perform service verification on the backhaul service to obtain a service verification result may include the following operations: invoking a first verification function in the verification processing data to perform function verification on the service hash of each service and the service execution proof, to obtain an execution service verification result of the block execution result; further, invoking a second verification function in the verification processing data to perform function verification on a result hash of the block execution result and the optimization proof, to obtain an optimization service verification result of the block optimization result; and further, determining, when the execution service verification result indicates that verification of the block execution result succeeds, and the optimization service verification result indicates that verification of the block optimization result succeeds, that the service verification result is a verification result for indicating that verification of the backhaul service succeeds.

The verification processing data is used to perform verification on a result obtained by the zero-knowledge proof circuit, and may be obtained by performing function verification based on a hash value of an input parameter of the zero-knowledge proof circuit and a corresponding circuit proof.

The performing verification on a result (that is, a block execution result) obtained by the zero-knowledge proof execution circuit (that is, performing verification on correct execution of each service) may be specifically performing verification based on a hash value of an input parameter of the zero-knowledge proof execution circuit (that is, a service hash of each of N services) and a corresponding circuit proof (that is, a service execution proof).

The performing verification on a result (that is, a block optimization result) obtained by the zero-knowledge proof optimization circuit (that is, performing verification on optimization of a block execution result) may be specifically performing verification based on a hash value of an input parameter of the zero-knowledge proof optimization circuit (that is, a result hash of the block execution result) and a corresponding circuit proof (that is, an optimization proof).

The first verification function may be used for verifying whether a block execution result is executed based on a correct zero-knowledge proof execution circuit. The execution service verification result may be a verification result for a block execution result. The execution service verification result may be used to indicate that verification of the block execution result succeeds or verification of the block execution result fails.

The second verification function may be used to verify whether a block optimization result is obtained through data optimization based on a correct zero-knowledge proof optimization circuit. The optimization service verification result may be a verification result for a block optimization result. The optimization service verification result may be used to indicate whether verification of the block optimization result succeeds or verification of the block optimization result fails.

Only when both the execution service verification result and the optimization service verification result indicate that verification succeeds, the service verification result is used to indicate that verification of the backhaul service succeeds.

Specifically, the invoking verification processing data corresponding to the service aggregation process, to perform service verification on the backhaul service to obtain a service verification result to be returned to the service node may also include the following operations: invoking a first verification function in the verification processing data to perform contract verification processing on service hashes and service execution proofs of the N services, to obtain an execution service verification result of the block execution result; further, invoking a second verification function in the verification processing data to perform contract verification processing on a result hash of the block execution result and the optimization proof, to obtain an optimization service verification result of the block optimization result; and further, determining, when the execution service verification result indicates that verification of the block execution result fails, or the optimization service verification result indicates that verification of the block optimization result fails, that the service verification result is used to indicate that verification of the backhaul service fails.

When either of the execution service verification result or the optimization service verification result indicates that verification fails, the service verification result is used to indicate that verification of the backhaul service fails.

In an embodiment, the service processing node is configured to maintain a data chain, a height determination block in the data chain is determined after the local consensus node determines a block height of a block in the data chain, and a block generation timestamp of the height determination block is greater than a block generation timestamp of the block to be processed. In this case, this embodiment may further include the following operations: when the service verification result is used to indicate that verification of the backhaul service succeeds, determining a block height that is of the block to be processed in the data chain and that is indicated by a blockhead of the block to be processed, and using the block height of the block to be processed as a to-be-determined height; and further, obtaining a maximum block determination height from block heights of the height determination blocks, updating the maximum block determination height based on the to-be-determined height, using, as a height determined block, a block corresponding to a determination height between the maximum block determination height that is not updated and the maximum block determination height that is updated, and updating the height determination block based on the height determined block.

The height determination block is a block obtained after the local consensus node determines a block height of a block in the data chain. Each block on the data chain may have a corresponding block generation timestamp, and the block generation timestamp is also referred to as a block timestamp. The block generation timestamp is used to indicate information about a time for generating a block.

The maximum block determination height may be a block height having the maximum height value among block heights of the height determination block.

The updating the maximum block determination height based on the to-be-determined height may be determining the to-be-determined height as the maximum block determination height. For example, the maximum block determination height that is not updated is 50 and the to-be-determined height (that is, the block height of the block to be processed) is 51. In this case, the maximum block determination height that is updated is 51.

The block corresponding to the determination height between the maximum block determination height that is not updated and the maximum block determination height that is updated may include a block corresponding to the maximum block determination height that is updated, but does not include a block corresponding to the maximum block determination height that is not updated. The local consensus node may update the maximum block determination height and the height determination block each time when a service verification result is used to indicate that verification of the backhaul service succeeds. Alternatively, the local consensus node may update the maximum block determination height and the height determination block only when a particular quantity of service verification results of the backhaul service are used to indicate that verification of the backhaul service succeeds. This is not limited herein. For example, the maximum block determination height that is not updated is 50, and the maximum block determination height that is updated is 51. In this case, the height determined block may be a block whose height is determined as 51. That is, the height determination block that is updated may include the block whose height is determined as 51 and the height determination block that is not updated. For another example, the maximum block determination height that is not updated is 46, and the maximum block determination height that is updated is 51. In this case, the height determined block may be blocks whose heights are determined as 47, 48, 49, 50, and 51. That is, the height determination block that is updated may include blocks whose heights are determined as 47, 48, 49, 50, and 51 and the height determination block that is not updated.

By continuously updating the height determination block and the maximum block determination height, the local consensus node may manage a block increase speed on the data chain. For example, when the maximum block determination height that is updated is greater than a preset expected value, it indicates that a block height increase speed on the data chain is excessively high, and then the local consensus node may notify the management node to suspend a corresponding service aggregation process.

In an embodiment, when the service verification result is used to indicate that verification of the backhaul service succeeds, it may be determined that a status of the height determination block that is updated becomes valid, and subsequently the outside (for example, a service node or a global consensus node) may read, from the local consensus node, an optimized block execution result of the block whose status becomes valid.

In an embodiment, if the service verification result is used to indicate that verification of the backhaul service fails, the service processing node is notified to regenerate a backhaul service.

The service processing node is notified to regenerate a backhaul service, thereby avoiding verification failure caused by a data format error of the backhaul service or a service format error of the service.

The service verification result is used to indicate that verification of the backhaul service fails. This may be because an incorrect zero-knowledge proof circuit is used, an incorrect service hash of a service is used during verification, a malicious person causes trouble, a data format of the backhaul service is incorrect, a service format of the service is incorrect, or the like. This is not limited herein. To put it simply, a system implementation is incorrect, and then a corresponding error may be detected based on some error detection mechanisms, or processing may be performed based on some management mechanisms. This is not limited herein. In an embodiment, when no malicious person causes trouble, if verification of the backhaul service fails, a system of the service aggregation process may be problematic. Reset of the data chain may be canceled, or the service processing node may be notified to perform block rollback on the data chain whose verification fails, or the data chain may be processed in some other manners. This is not limited herein.

As described above, if a service is sent by a service node to the local consensus node and then forwarded by the local consensus node to the service processing node, after verifying a backhaul service corresponding to the service, the local consensus node may return a service execution result of the service that is obtained after data optimization and a service verification result to the corresponding service node. Because all service execution results of the backhaul service received by the local consensus node are service execution results obtained after the data optimization, a service execution result returned by the local consensus node to the service node can only be a service execution result obtained after the data optimization, thereby ensuring privacy and security of data.

In an embodiment, the block execution result includes a service execution result of the first service; the service execution result of the first service is obtained by executing the first service in the block to be processed; the block optimization result includes an optimized service execution result of the first service; and the optimized service execution result of the first service is obtained after optimizing data of the service execution result of the first service. In this case, this embodiment further includes: determining, when the service verification result to be returned to the service node is obtained, that the optimized service execution result of the first service in the backhaul service on which the service verification has been performed is an optimized service feedback result, and returning the optimized service feedback result to the first service node.

The optimized service feedback result may be a result to be returned to the service node. As described above, if a service is sent by a service node to the local consensus node and then forwarded by the local consensus node to the service processing node, after verifying a backhaul service corresponding to the service, the local consensus node may return a service execution result obtained after data optimization (that is, an optimized service execution result) and a service verification result of the service to the corresponding service node. Because all service execution results of the backhaul service received by the local consensus node are service execution results obtained after the data optimization, a service execution result returned by the local consensus node to the service node is also a service execution result obtained after the data optimization, thereby ensuring privacy and security of data.

Specifically, the block execution result includes a service execution result of the first service; the service execution result of the first service is obtained by executing the first service in the block to be processed; the block optimization result includes an optimized service execution result of the first service; and the optimized service execution result of the first service is obtained after optimizing data of the service execution result of the first service. In this case, this embodiment further includes: determining, when the service verification result to be returned to the service node is obtained, that the optimized service execution result of the first service in the backhaul service on which the service verification has been performed is an optimized service feedback result, and returning the optimized service feedback result to the first service node.

The first service may be a service that is sent by the first service node to the local consensus node and that is forwarded by the local consensus node to the service processing node. The block execution result may include a service execution result of each of the N services, and the service execution result of each service is obtained by executing a corresponding service. The block optimization result may include an optimized service execution result of each of the N services, and the optimized service execution result of each service is obtained by optimizing data of a corresponding service execution result. For example, the service execution result of the first service is obtained by executing the first service, and the optimized service execution result of the first service is obtained by optimizing data of the service execution result of the first service. The local consensus node may return the service execution result of the first service to the first service node, and the local consensus node may further return the service verification result of the first service to the first service node. The local consensus node may send the optimized service execution result and the service verification result of the first service to the first service node together, or the local consensus node may separately send the service execution result and the service verification result of the first service to the first service node. This is not limited herein.

As described above, if a service is directly sent by a service node to the service processing node, after verifying a backhaul service corresponding to the service, the local consensus node may return only a service verification result of the service to the corresponding service node. This is because the service execution result of the service is directly returned by the service processing node to the corresponding service node.

The service node may also synchronize a status of the local consensus sub-chain to determine that a service sent by the service node has been determined on the local consensus sub-chain at a particular block height, thereby confirming the finality of the result of the service, so that service query for the service may be performed subsequently. For example, a block height value at which a block of a service A is written into the data chain is X, a backhaul service corresponding to the service A is backhauled to the local consensus node, and the local consensus node performs service verification on the backhaul service on a block whose block height value is Y on the local consensus sub-chain. The service node may also synchronize a status of the local consensus sub-chain to determine that the service A that is sent by the service node and that is at the block height value X on the data chain has been determined on the local consensus sub-chain.

After a backhaul service corresponding to some services is written into the local consensus sub-chain, the local consensus node may aggregate optimized service execution results of the services within a particular time, and upload information obtained through aggregation (that is, aggregation information) to the global consensus node, so that the global consensus node in the global consensus network may know a current aggregation status of the local consensus network for some local services, without obtaining all service data in the local consensus network, thereby reducing resource occupation and load of the global consensus node.

Specifically, this embodiment may further include the following operations: determining, based on the service verification result, service optimization aggregation information associated with each service; further, adding the service optimization aggregation information associated with each service to an optimization information aggregation pool, and obtaining an aggregation timestamp for performing information aggregation on the service optimization aggregation information in the optimization information aggregation pool; further, performing, when the aggregation timestamp reaches an aggregation time threshold, information aggregation on the service optimization aggregation information in the optimization information aggregation pool, to obtain aggregation information associated with each service; and further, transmitting, to the global consensus node in the global consensus network by using a cross-chain relay associated with the local consensus node, an aggregation service corresponding to the aggregation information, so that the global consensus node links the aggregation service to a global consensus chain maintained by the global consensus node.

The service optimization aggregation information may be a dimension of information that needs to be used to determine uploaded aggregation information of the global consensus node. The service optimization aggregation information of each service may be determined based on an optimized service execution result of each service in the backhaul service. For example, if the service is a tax refund service for tax refund, that is, the aggregation information that needs to be aggregated to the global consensus node is a quantity of objects for which tax refund is completed within each tax refund amount range within a particular time, the determined service optimization aggregation information may include information such as whether tax refund is completed and a tax refund amount.

If the service verification result indicates that verification of the backhaul service succeeds, the service optimization aggregation information of each service associated with the backhaul service is determined. If the service verification result indicates that verification of the backhaul service fails, the service optimization aggregation information of each service associated with the backhaul service does not need to be determined. That is, the aggregation information is determined based on service optimization aggregation information of services related to the backhaul service that is successfully verified.

The optimization information aggregation pool may be used to store service optimization aggregation information corresponding to each service. The aggregation timestamp may be time information corresponding to information aggregation performed on the service optimization aggregation information in the optimization information aggregation pool. The aggregation time threshold may be a time threshold that needs to be reached for the aggregation timestamp when information aggregation is performed on the service optimization aggregation information in the optimization information aggregation pool. For example, information aggregation may be performed on the service optimization aggregation information in the optimization information aggregation pool once at 0 o'clock each day. In this case, when the aggregation timestamp corresponding to the optimization information aggregation pool reaches 0 o'clock each day, information aggregation is performed on the service optimization aggregation information in the optimization information aggregation pool, to obtain the service aggregation information. For example, the service aggregation information may be a quantity of objects for which tax refund is completed within each tax refund amount range within a time (for example, within one day) corresponding to the aggregation time threshold.

The cross-chain relay may be a device configured to implement cross-chain interaction between the local consensus node and the global consensus node, for example, the provincial main chain SPV node. The aggregation service may be a service constructed based on the aggregation information. When sending the aggregation information to the global consensus node, the aggregation information needs to be sent in a service form, that is, service encapsulation may be performed on the aggregation information to obtain an aggregation service. Then, the local consensus node may send the aggregation service to the global consensus node, so that the global consensus node links the aggregation service to a global consensus chain maintained by the global consensus node.

When receiving the aggregation service, the global consensus node may store the aggregation service in a global service pool corresponding to the global consensus chain, use the aggregation service as a global service, then when the global service pool reaches a service packaging condition corresponding to the global service pool (for example, a timestamp corresponding to the global service pool reaches a time threshold, or a quantity of to-be-processed services in the global service pool reaches a quantity threshold), perform service packaging processing on the global service in the global service pool to obtain a corresponding block, then perform block consensus on the global service in the block, and when block consensus is reached, may write the block into the global consensus chain, that is, the global consensus node links the aggregation service to the global consensus chain maintained by the global consensus node, that is, uploads the aggregation information to the global consensus node.

As can be seen, in this embodiment, the service aggregation process started and run in the service processing node may obtain a sensitive service that carries sensitive data and that is transmitted by any service node associated with the local consensus network, and when N services including the sensitive service are aggregated and packaged into a block to be processed, the service aggregation process may be further invoked to execute the block to be processed by using a block as a unit, to obtain a block execution result and a service execution proof of the block to be processed. Accordingly, when the block execution result of the block to be processed also includes the sensitive data that needs to be desensitized, the service aggregation process may be further invoked to optimize the block execution result by using a block as a unit, to obtain a block optimization result and an optimization proof. Then, when obtaining other auxiliary proofs (for example, the result hash of the block execution result, the service hash of each service, and the blockhead of the block to be processed), the service processing node may further construct, based on the block optimization result, the optimization proof, and the other auxiliary proofs (for example, the result hash of the block execution result, the service hash of each service, and the blockhead of the block to be processed), the backhaul service to be backhauled to the local consensus node. The service parameters in the backhaul service are all desensitized parameters. Accordingly, the local consensus node obtains a result hash of a block execution result obtained after desensitizing the block execution result, instead of each service execution result including sensitive data in the block execution result. Similarly, the local consensus node obtains a desensitized service hash of a sensitive service, instead of the sensitive service including sensitive data. Accordingly, when the local consensus node subsequently links the backhaul service to the local consensus sub-chain, service privacy and security of the service linked to the local consensus sub-chain can also be ensured. In addition, when obtaining the backhaul service, the local consensus node directly invokes verification processing data corresponding to the service aggregation process, to perform service verification on the backhaul service. That is, only the circuit proof (for example, the service execution proof and the optimization proof) in the backhaul service needs to be used to verify whether the block optimization result obtained on the service processing node side is obtained through correct execution and optimization, and a specific execution process of executing a large quantity of services and a specific optimization process of optimizing data of a large quantity of service execution results do not need to be known. Accordingly, calculation overheads of executing a large quantity of services and calculation overheads of optimizing data of a large quantity of service execution results can be fundamentally reduced on the local consensus node side.

Figure 7:
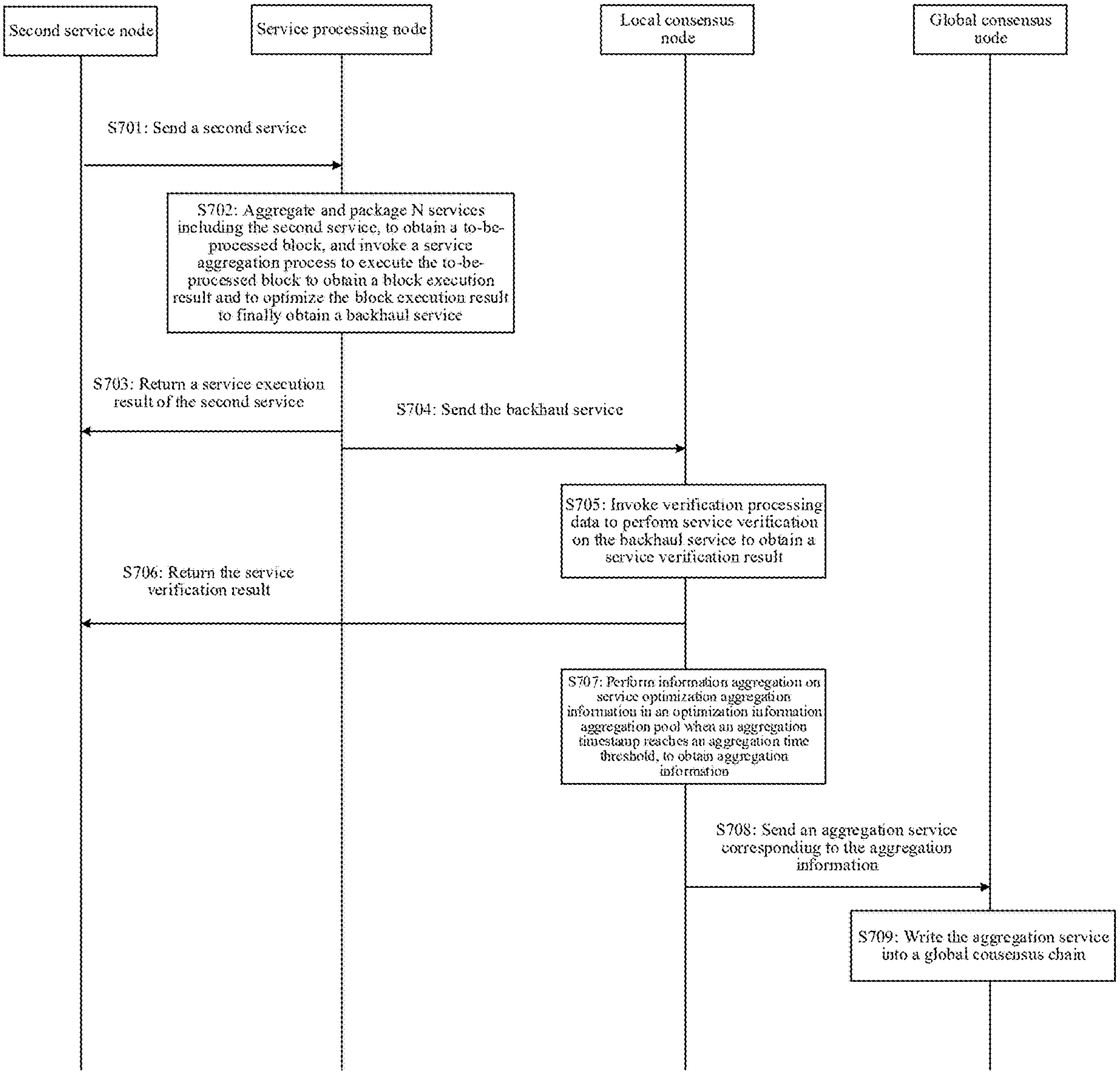
FIG. 7 is a schematic interaction diagram of a data processing method based on a hierarchical chain according to an embodiment of this application.

The entire data processing process is described herein with reference to a figure. FIG. 7 is a schematic interaction diagram of a data processing method based on a hierarchical chain according to an embodiment of this application. As shown in FIG. 7, the data processing method relates to a service processing node, a local consensus node in a local consensus network, a global consensus node in a global consensus network, and a second service node. A service aggregation process corresponding to the service processing node needs to be registered and examined in a global consensus network, and starting of the service aggregation process is authorized after the local consensus node performs verification.

Specifically, a second service node sends a second service to a service processing node (operation S701). The service processing node aggregates and packages N services including the second service, to obtain a block to be processed, and invokes a service aggregation process to execute the block to be processed to obtain a block execution result and to optimize the block execution result to finally obtain a backhaul service (operation S702). A specific process of obtaining the backhaul service can be found in the description of the corresponding embodiment of FIG. 4. Details are not described herein again.

Then, the service processing node may return a service execution result of the second service to the second service node (operation S703). The service execution result of the second service that is returned to the second service node may be a service execution result of the second service in the block execution result. In this case, the service execution result of the second service is a service execution result of the second service whose data has not been optimized. In an embodiment, in this embodiment, after the block execution result is optimized, an optimized service execution result of the second service that is obtained by performing data optimization and that is in the optimized block execution result (that is, the block optimization result) may be further returned to the second service node. Alternatively, in this embodiment, service execution results of the second service obtained in the foregoing two cases may be returned. This is not limited herein. As shown in FIG. 7, the service processing node may further send the backhaul service to a local consensus node (operation S704). The local consensus node may invoke verification processing data to perform service verification on the backhaul service, to obtain a service verification result (operation S705). Then, the local consensus node may return the service verification result to the second service node (operation S706).

Further, when an aggregation timestamp reaches an aggregation time threshold, the local consensus node may perform information aggregation on service optimization aggregation information in an optimization information aggregation pool, to obtain aggregation information (operation S707). Then, the local consensus node sends an aggregation service corresponding to the aggregation information to a global consensus node (operation S708). Then, the global consensus node may write the aggregation service into a global consensus chain (operation S709).

Figure 8:
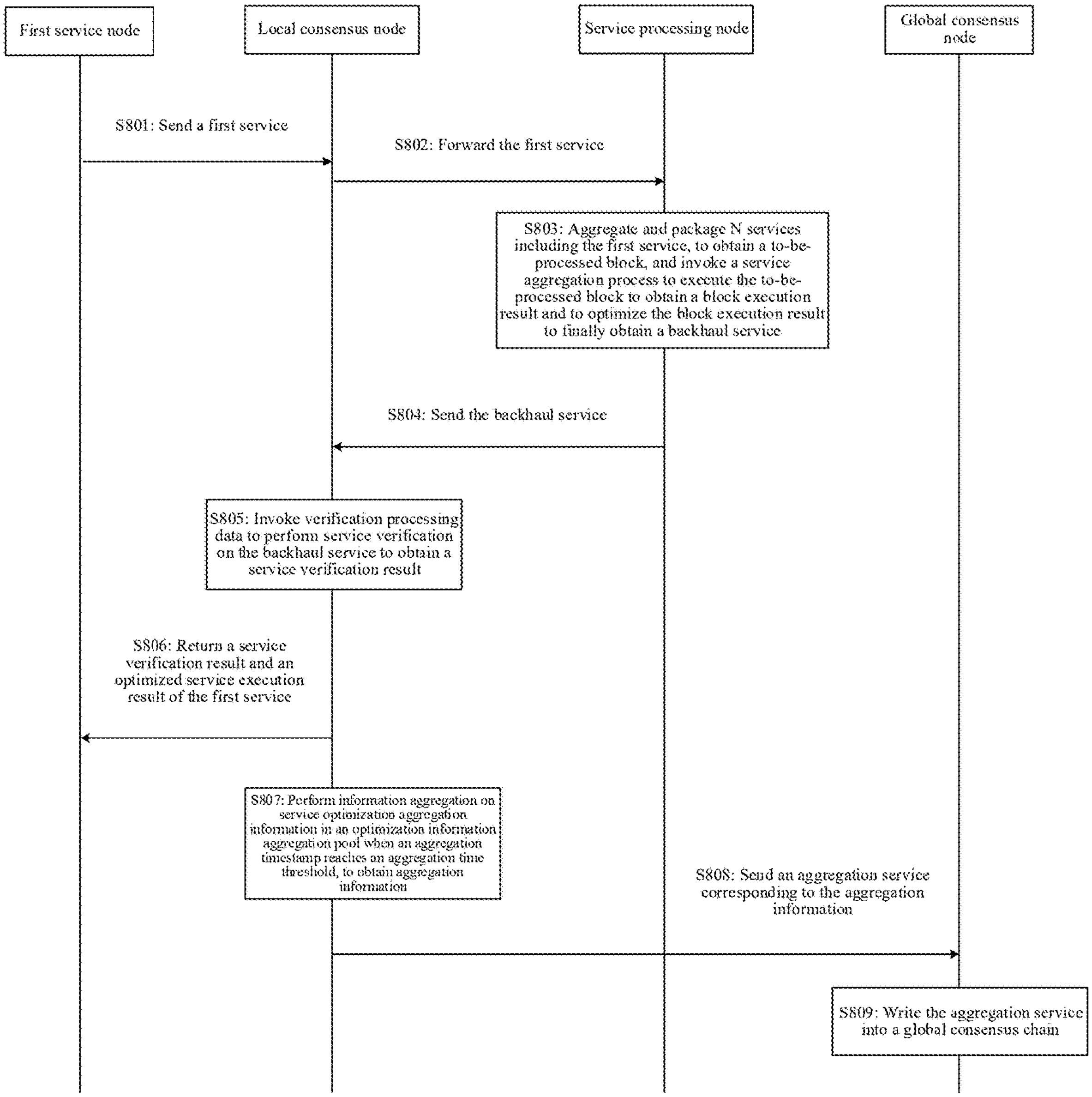
FIG. 8 is a schematic interaction diagram of a data processing method based on a hierarchical chain according to an embodiment of this application.

Another data processing process is described herein with reference to a figure. FIG. 8 is a schematic interaction diagram of a data processing method based on a hierarchical chain according to an embodiment of this application. As shown in FIG. 8, the data processing method relates to a service processing node, a local consensus node in a local consensus network, a global consensus node in a global consensus network, and a first service node. A service aggregation process corresponding to the service processing node needs to be registered and examined in a global consensus network, and starting of the service aggregation process is authorized after the local consensus node performs verification.

Specifically, a first service node sends a first service to a local consensus node (operation S801). The local consensus node forwards the first service to a service processing node (operation S802). The service processing node performs service packaging processing on N services including the first service, to obtain a block to be processed, and invokes a service aggregation process to execute the block to be processed to obtain a block execution result and to optimize the block execution result to finally obtain a backhaul service (operation S803). Then, the service processing node sends the backhaul service to the local consensus node (operation S804). The local consensus node may invoke verification processing data to perform service verification on the backhaul service, to obtain a service verification result (operation S805). Then, the local consensus node returns the service verification result and an optimized service execution result of the first service to the first service node (operation S806). Further, when an aggregation timestamp reaches an aggregation time threshold, the local consensus node may perform information aggregation on service optimization aggregation information in an optimization information aggregation pool, to obtain aggregation information (operation S807). Then, the local consensus node sends an aggregation service corresponding to the aggregation information to a global consensus node (operation S808). Then, the global consensus node may write the aggregation service into a global consensus chain (operation S809).

Figure 9:
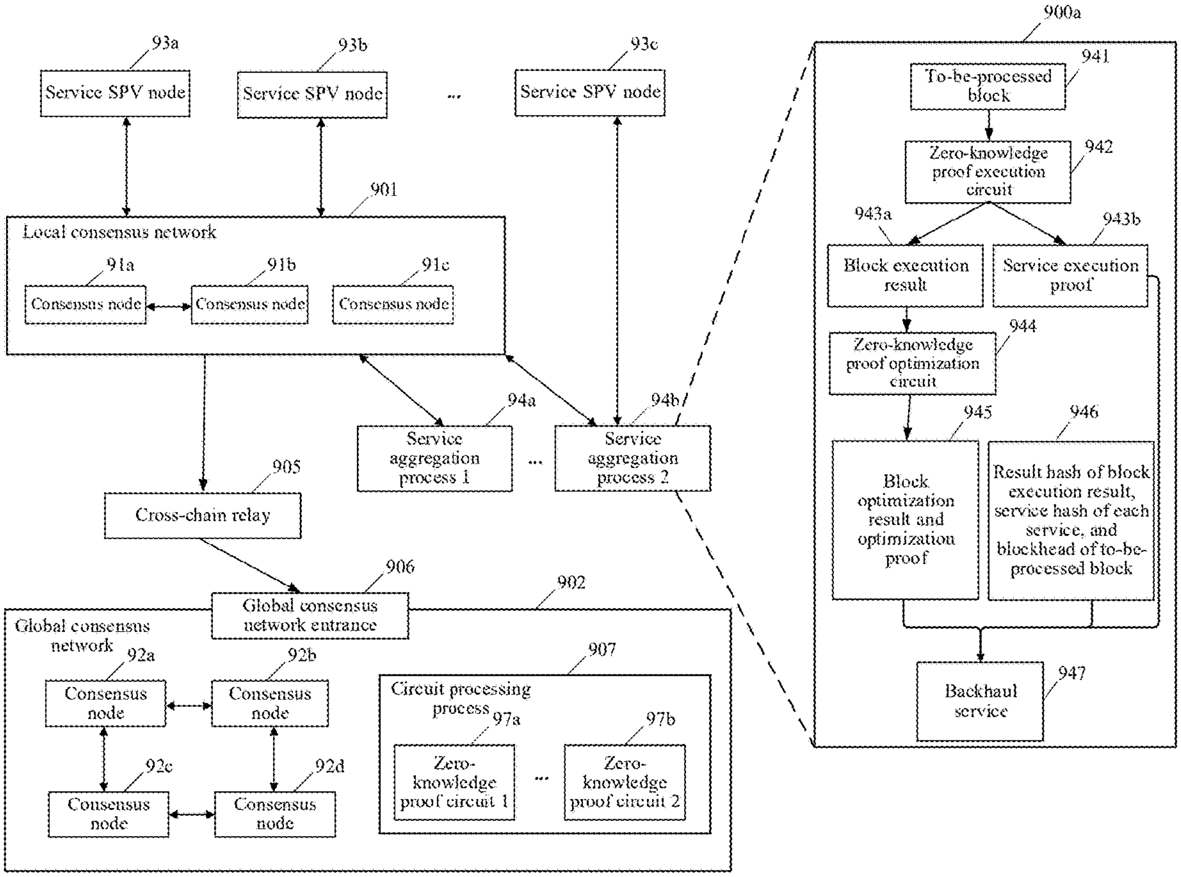
FIG. 9 is a schematic flowchart of a processing process of a hierarchical chain network according to an embodiment of this application.

A data processing process of the entire hierarchical chain network is described herein with reference to a scenario diagram. FIG. 9 is a schematic flowchart of a processing process of a hierarchical chain network according to an embodiment of this application. As shown in FIG. 9, in the hierarchical chain network, service aggregation processes such as a service aggregation process 1 (that is, shown in 94*a*) and a service aggregation process 2 (that is, shown in 94*b*) are deployed based on a local consensus network. The service aggregation process 1 (that is, shown in 94*a*) and the service aggregation process 2 (that is, shown in 94*b*) may be configured to process sensitive services of different types. A service processing node on which the service aggregation process 1 runs may correspond to a data service network. The data service network may include one or more service processing nodes configured to process sensitive services of the same type. A service processing node on which the service aggregation process 2 runs may correspond to another data service network. The another data service network may include one or more service processing nodes that process sensitive services of another type. This means that in the hierarchical chain network, the service processing node corresponding to the service aggregation process 1 and the service processing node corresponding to the service aggregation process 2 are different nodes.

In this embodiment, the service processing node on which the service aggregation process runs may receive a sensitive service of a corresponding type that is forwarded by a local consensus node (for example, a consensus node 91*a*, a consensus node 91*b*, or a consensus node 91*c*), or may receive a sensitive service of a corresponding service type that is directly sent by a service SPV node (for example, a service SPV node 93*c*). This is not limited herein. When the service processing node on which the service aggregation process runs receives a sensitive service forwarded by a local consensus node (for example, the consensus node 91*a*, the consensus node 91*b*, or the consensus node 91*c*), for an interaction process of the nodes, refer to the related description of FIG. 8. In an embodiment, when the service processing node on which the service aggregation process runs receives a sensitive service directly send by a service SPV node (for example, the service SPV node 93*c*), for an interaction process of the nodes, refer to the related description of FIG. 7. Details are not described herein again.

For ease of understanding, that the service aggregation process is the service aggregation process 2 shown in FIG. 9 is used as an example herein. For a processing process of the service aggregation process 2, refer to a service processing process shown in 900*a*. For details of the service processing process shown in 900*a*, refer to the related description of FIG. 5. That is, the service processing node may obtain a block to be processed 941 shown in FIG. 9, then invoke a zero-knowledge proof execution circuit 942 to execute the block to be processed, to obtain a block execution result 943*a* and a service execution proof 943*b*, then input the block execution result 943*a* to a zero-knowledge proof optimization circuit 944, to invoke the zero-knowledge proof optimization circuit to optimize the block execution result 943*a*, to obtain a block optimization result and an optimization proof 945, and then construct a backhaul service 947 shown in FIG. 9 based on the block optimization result, the optimization proof 945, the service execution proof 943*b*, a result hash of the block execution result, a service hash of each of the N services, and a blockhead 946 of the block to be processed.

When information aggregation needs to be performed on service execution results of services associated with the backhaul service on the local consensus sub-chain, the local consensus node may obtain aggregation information through aggregation, and then the local consensus node may send an aggregation service corresponding to the aggregation information to the global consensus network 902 by using the cross-chain relay 905. Specifically, an aggregation service corresponding to the service aggregation information may be sent to a global consensus network entrance 906 by using a cross-chain relay 905, and then the global consensus network entrance 906 sends the aggregation service to the global consensus network 902. Then, a global consensus node (for example, the consensus node 92*a*, the consensus node 92*b*, the consensus node 92*c*, and the common node 92*d*) in the global consensus network may write the aggregation service into the global consensus chain. For a data exchange process between the local consensus network 901 and the global consensus network 902, refer to related descriptions of FIG. 7 and FIG. 8, and details are not described herein again.

The service aggregation process 1 and the service aggregation process 2 may both be service processes that have been registered and examined in the global consensus network. Besides, after registering and examining the service aggregation process, the global consensus node may store, in the circuit processing process 907, a zero-knowledge proof circuit corresponding to the service aggregation process that has been registered and examined, such as a zero-knowledge proof circuit 1 (that is, 97*a*) or a zero-knowledge proof circuit 2 (that is, 97*b*) included in the circuit processing process 907.

In the embodiments of this application, in a basic infrastructure of a hierarchical chain network (a global consensus network and a local consensus network), the local consensus network may be deployed in a service layer, and the global consensus network may be deployed in a consensus layer. In addition, to ensure service privacy and security of some services (for example, sensitive services) associated with the local consensus network, in the embodiments of this application, a service processing node independent of a local consensus node may be deployed in the service layer of the hierarchical chain network. The local consensus node may be configured to: when determining that a service aggregation process of the service processing node has been registered and examined on the global consensus node, authorize the service processing node to start the service aggregation process. In the embodiments of this application, when obtaining a block to be processed including N services, the service processing node may further invoke the service aggregation process to execute the N services in the block to be processed, to obtain a service execution result of each of the N services and a service execution proof associated with each service. The service execution proof may be an evidence for indicating that each service is correctly executed. Then, the service processing node may invoke the service aggregation process to optimize, by using a block as a unit, a block execution result determined based on each service execution result, to obtain a block optimization result and an optimization proof. Accordingly, the service processing node may construct, based on all results (for example, the block optimization result, a result hash of the block execution result, a service hash of each service, the service execution proof, the optimization proof, and a blockhead of the block to be processed) obtained by invoking the service aggregation process, a backhaul service to be backhauled to the local consensus node, and backhaul the backhaul service to the local consensus node. Therefore, the local consensus node may invoke verification processing data corresponding to the service aggregation process, to perform service verification to obtain an optimized service execution result of each service after data of the service execution result is optimized. That is, in the embodiments of this application, data exchange among the global consensus node, the local consensus node, and the service processing node can ensure privacy and security of service data of a sensitive service related to the local consensus node.

Figure 10:
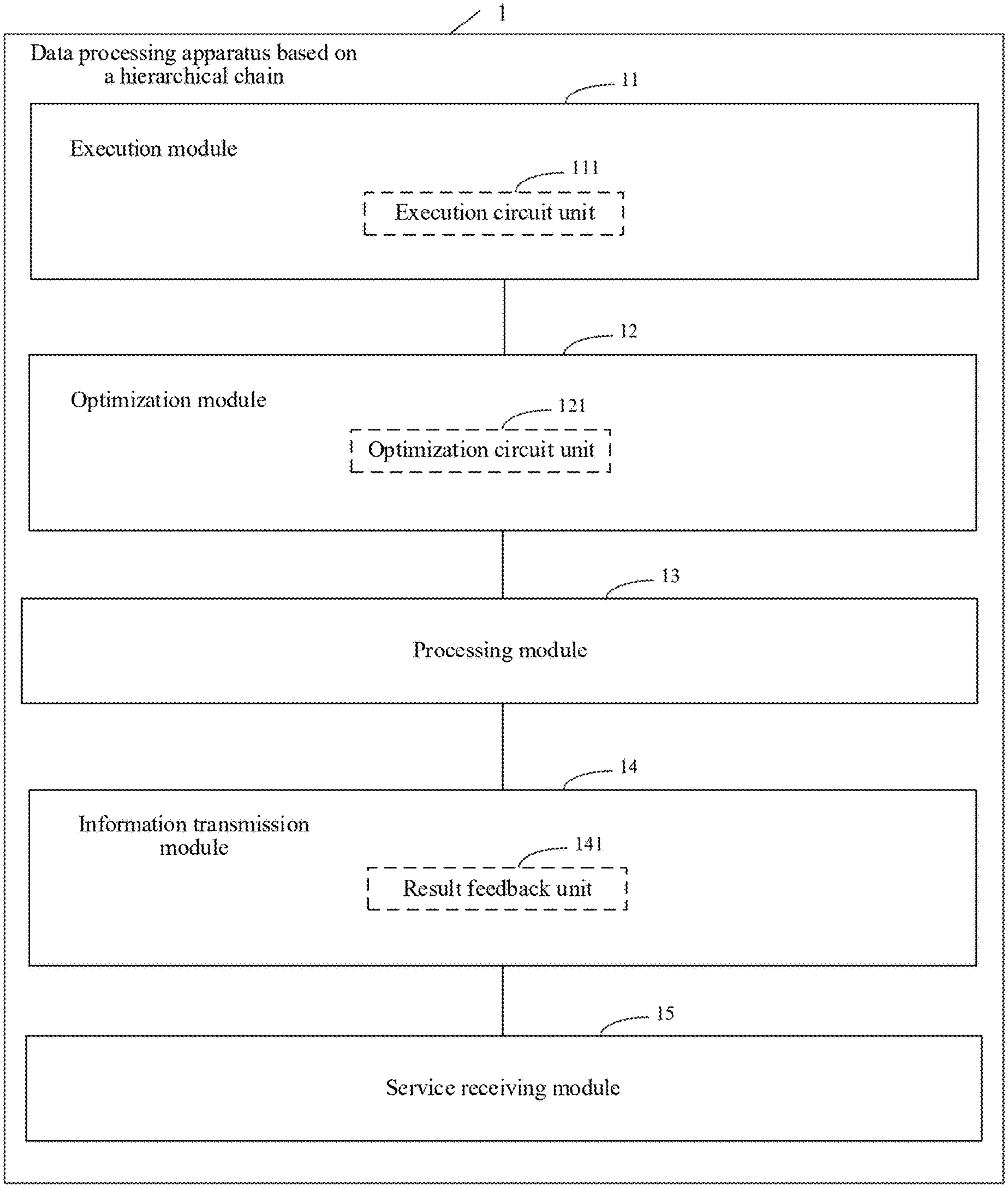
FIG. 10 is a first schematic structural diagram of a data processing apparatus based on a hierarchical chain according to an embodiment of this application.

FIG. 10 is a first schematic structural diagram of a data processing apparatus based on a hierarchical chain according to an embodiment of this application. As shown in FIG. 10, the data processing apparatus 1 based on a hierarchical chain may be a computer program (including program code) running on a service processing node. For example, the data processing apparatus 1 based on a hierarchical chain is application software. The data processing apparatus 1 based on a hierarchical chain may be configured to perform corresponding operations in the data processing method based on a hierarchical chain provided in the embodiments of this application. As shown in FIG. 10, the data processing apparatus 1 based on a hierarchical chain may include: an execution module 11, an optimization module 12, a processing module 13, and an information transmission module 14.

The execution module 11 is configured to invoke, when N services are aggregated and packaged into a block to be processed, the service aggregation process to execute the block to be processed, to obtain a service execution result of each service and a service execution proof associated with each service, N being a positive integer, each service being a sensitive service that carries sensitive data and that is transmitted by a service node associated with the local consensus node, and the service execution proof being an evidence for indicating that each service is correctly executed.

The optimization module 12 is configured to determine the service execution result of each service as a block execution result of the block to be processed, and invoke the service aggregation process to optimize the block execution result, to obtain a block optimization result and an optimization proof associated with the block execution result, the optimization referring to hiding or blurring the sensitive data in the service execution result of each service, the block optimization result referring to an optimized block execution result, and the optimization proof being an evidence for indicating that the block execution result is optimized.

The processing module 13 is configured to obtain, based on the block optimization result, a result hash of the block execution result, a service hash of each service, the service execution proof, the optimization proof, and a blockhead of the block to be processed, a backhaul service to be backhauled to the local consensus node.

The information transmission module 14 is configured to backhaul the backhaul service to the local consensus node, so that the local consensus node invokes verification processing data corresponding to the service aggregation process, to perform service verification on the backhaul service to obtain a service verification result to be returned to the service node, the service verification referring to verifying, by using a circuit proof in the backhaul service, that the block optimization result is obtained through correct execution and optimization, and the circuit proof including the service execution proof and the optimization proof.

The execution module 11 includes: an execution circuit unit 111.

The execution circuit unit 111 is configured to obtain, from a zero-knowledge proof circuit corresponding to the service aggregation process, a zero-knowledge proof execution circuit associated with the block to be processed, and invoke the zero-knowledge proof execution circuit to execute each service in the block to be processed, to obtain the N service execution results of all the services and the service execution proofs associated with all the services.

The optimization module 12 includes: an optimization circuit unit 121.

The optimization circuit unit 121 is configured to obtain, from the zero-knowledge proof circuit corresponding to the service aggregation process, the zero-knowledge proof optimization circuit associated with the block execution result, and invoke the zero-knowledge proof optimization circuit to optimize the data of the block execution result, to obtain the block optimization result and the optimization proof associated with the block execution result.

The service node includes a first service node deployed in the hierarchical chain network, and the first service node is a node that is in a service network of the hierarchical chain network and that is configured to transmit a service to the local consensus node, and the service transmitted by the first service node to the local consensus node is a first service.

The data processing apparatus 1 based on a hierarchical chain further includes: a service receiving module 15.

The service receiving module 15 is configured to receive the first service forwarded by the local consensus node, and use the first service as a service of the N services; where a service type of the first service is consistency with a service type of each of the services.

The service node includes a second service node deployed in the hierarchical chain network, and the second service node is a node that is in a service network of the hierarchical chain network and that is configured to directly transmit a service to the service processing node.

The service receiving module 15 is further configured to receive the second service transmitted by the second service node, and use the received second service as a service of the N services; where a service type corresponding to the second service is consistency with a service type of each of the N services.

The block execution result includes a service execution result of the second service; and the service execution result of the second service is recorded when the second service in the block to be processed is executed.

The information transmission module 14 includes a result feedback unit 141.

The result feedback unit 141 is configured to return the service execution result of the second service to the second service node.

The block optimization result includes an optimized service execution result of the second service; and the optimized service execution result of the second service is obtained after optimizing data of the service execution result of the second service during optimization of the block execution result.

The result feedback unit 141 is further configured to return the optimized service execution result of the second service to the second service node.

A data service network corresponding to the service processing node is independent of the global consensus network and the local consensus network; and a data chain corresponding to the data service network is constructed based on service types of the N services.

The processing module 13 is further configured to use, when obtaining the block optimization result, the block to be processed as a target block to be linked to the data chain; and the processing module 13 is further configured to write the target block into the data chain based on a data linking policy indicated by the service aggregation process; where the data linking policy is a policy that the target block is directly written into the data chain when it is determined, by using the zero-knowledge proof circuit in the service aggregation process, that each service is correctly executed.

The data service network includes a secondary service node other than the service processing node; and the secondary service node is a data backup node configured to perform block backup processing on the target block; and the processing module 13 is further configured to transmit the target block to the data backup node when the target block is written into the data chain, so that the data backup node performs block backup processing on the target block.

Figure 11:
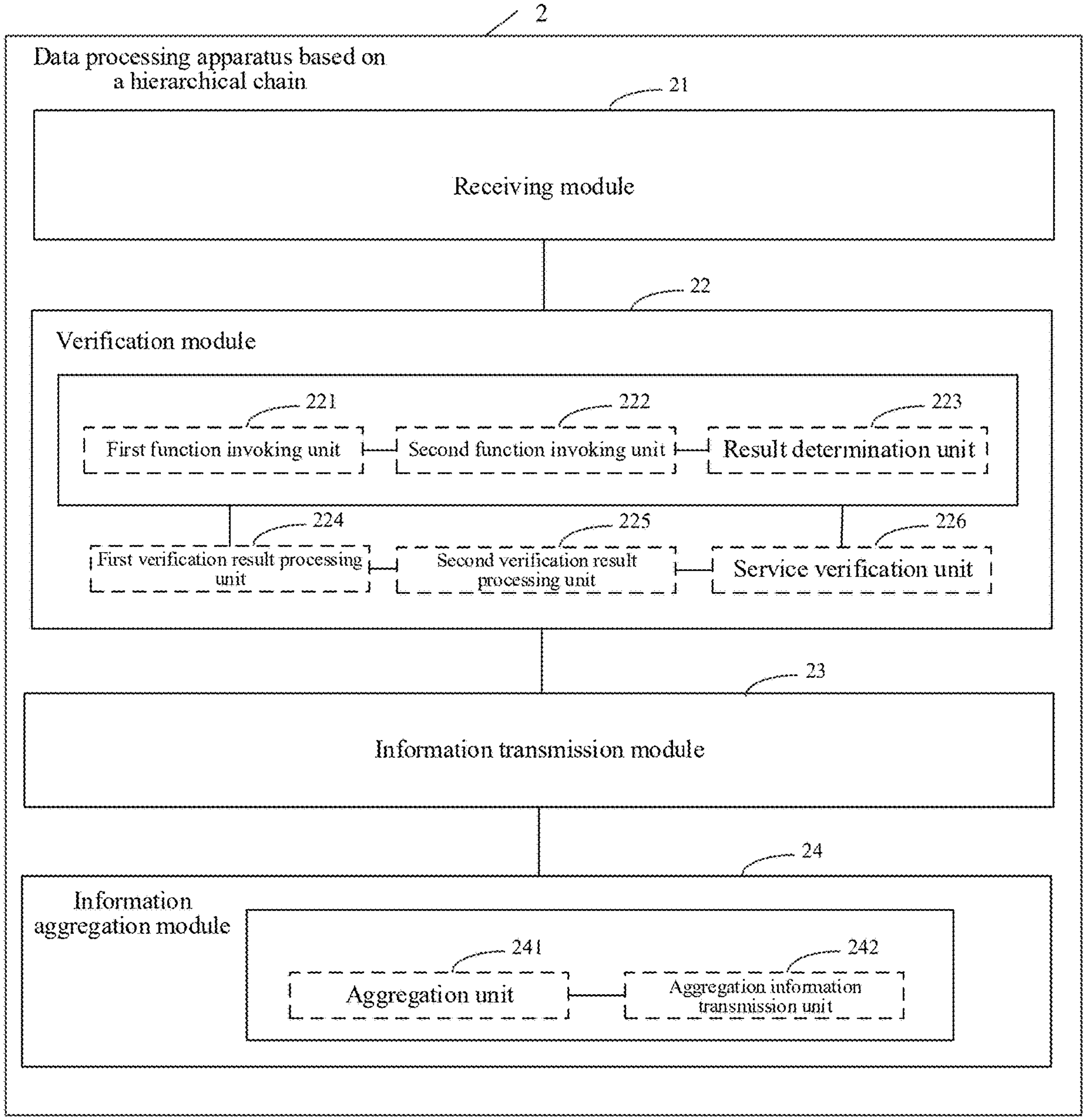
FIG. 11 is a second schematic structural diagram of a data processing apparatus based on a hierarchical chain according to an embodiment of this application.

FIG. 11 is a second schematic structural diagram of a data processing apparatus based on a hierarchical chain according to an embodiment of this application. As shown in FIG. 11, the data processing apparatus 2 based on a hierarchical chain may be a computer program (including program code) running on a local consensus node. For example, the data processing apparatus 2 based on a hierarchical chain is application software. The data processing apparatus 2 based on a hierarchical chain may be configured to perform corresponding operations in the data processing method based on a hierarchical chain provided in the embodiments of this application. As shown in FIG. 11, the data processing apparatus 2 based on a hierarchical chain may include: a receiving module 21 and a verification module 22.

The receiving module 21 is configured to receive a backhaul service transmitted by the service processing node, the backhaul service being obtained based on a block optimization result, a result hash of a block execution result, a service hash of each of N services included in the block to be processed, a service execution proof, an optimization proof, and a blockhead of the block to be processed, N being a positive integer, each service being a sensitive service that carries sensitive data and that is transmitted by a service node associated with the local consensus node, and the service execution proof being an evidence for indicating that each service is correctly executed, the block execution result being determined based on a service execution result of each service, a service execution result and a service execution proof of each service being obtained by the service processing node by invoking the service aggregation process to execute the block to be processed, and the block optimization result and the optimization proof being obtained by the service processing node by invoking the service aggregation process to optimize the block execution result.

The verification module 22 is configured to invoke verification processing data corresponding to the service aggregation process, to perform service verification on the backhaul service to obtain a service verification result, and return the service verification result to the service node; the service verification referring to verifying, by using a circuit proof in the backhaul service, that the block optimization result is obtained through correct execution and optimization, and the circuit proof including the service execution proof and the optimization proof.

The service node includes a first service node deployed in the hierarchical chain network.

The receiving module 21 is further configured to receive a first service transmitted by the first service node, and forward the first service to the service processing node.

The block execution result includes a service execution result of the first service; the service execution result of the first service is obtained by executing the first service in the block to be processed; the block optimization result includes an optimized service execution result of the first service; and the optimized service execution result of the first service is obtained after optimizing data of the service execution result of the first service.

The data processing apparatus 2 based on a hierarchical chain further includes an information transmission module 23.

The information transmission module 23 is configured to determine, when the service verification result to be returned to the service node is obtained, that the optimized service execution result of the first service in the backhaul service on which the service verification has been performed is an optimized service feedback result, and return the optimized service feedback result to the first service node.

The verification module 22 includes: a first function invoking unit 221, a second function invoking unit 222, and a result determination unit 223.

The first function invoking unit 221 is configured to invoke a first verification function in the verification processing data to perform function verification on the service hash of each service and the service execution proof, to obtain an execution service verification result of the block execution result.

The second function invoking unit 222 is configured to invoke a second verification function in the verification processing data to perform function verification on a result hash of the block execution result and the optimization proof, to obtain an optimization service verification result of the block optimization result.

The result determination unit 223 is configured to determine, when the execution service verification result indicates that verification of the block execution result succeeds, and the optimization service verification result indicates that verification of the block optimization result succeeds, that the service verification result is a verification result for indicating that verification of the backhaul service succeeds.

The first function invoking unit 221 is further configured to invoke the first verification function in the verification processing data to perform contract verification processing on the service hash of each service and the service execution proof, to obtain the execution service verification result of the block execution result.

The second function invoking unit 222 is further configured to invoke the second verification function in the verification processing data to perform contract verification processing on the result hash of the block execution result and the optimization proof, to obtain the optimization service verification result of the block optimization result.

The result determination unit 223 is further configured to determine, when the execution service verification result indicates that verification of the block execution result fails, or the optimization service verification result indicates that verification of the block optimization result fails, that the service verification result is a verification result for indicating that verification of the backhaul service fails.

The service processing node is configured to maintain a data chain, a height determination block in the data chain is determined after the local consensus node determines a block height of a block in the data chain, and a block generation timestamp of the height determination block is greater than a block generation timestamp of the block to be processed.

The verification module 22 further includes: a first verification result processing unit 224.

The first verification result processing unit 224 is configured to determine a block height that is of the block to be processed in the data chain and that is indicated by a blockhead of the block to be processed, and use the block height of the block to be processed as a to-be-determined height; and the first verification result processing unit 224 is further configured to obtain a maximum block determination height from block heights of the height determination blocks, update the maximum block determination height based on the to-be-determined height, use, as a height determined block, a block corresponding to a determination height between the maximum block determination height that is not updated and the maximum block determination height that is updated, and update the height determination block based on the height determined block.

The verification module 22 further includes: a second verification result processing unit 225.

The second verification result processing unit 225 is configured to: when the service verification result is used to indicate that verification of the backhaul service fails, notify the service processing node to regenerate a backhaul service.

The data processing apparatus 2 based on a hierarchical chain includes: an information aggregation module 24. The information aggregation module 24 includes: an aggregation unit 241 and an aggregation information transmission unit 242.

The aggregation unit 241 is configured to determine, based on the service verification result, service optimization aggregation information associated with each service. The aggregation unit 241 is further configured to add the service optimization aggregation information associated with each service to an optimization information aggregation pool, and obtain an aggregation timestamp for performing information aggregation on the service optimization aggregation information in the optimization information aggregation pool.

The aggregation unit 241 is further configured to perform, when the aggregation timestamp reaches an aggregation time threshold, information aggregation on the service optimization aggregation information in the optimization information aggregation pool, to obtain aggregation information associated with each service.

The aggregation information transmission unit 242 is configured to transmit, to the global consensus node in the global consensus network by using a cross-chain relay associated with the local consensus node, an aggregation service corresponding to the aggregation information, so that the global consensus node links the aggregation service to a global consensus chain maintained by the global consensus node.

The verification module 22 includes: a service verification unit 226.

The service verification unit 226 is configured to invoke, when receiving a starting service that is transmitted by the service processing node for the service aggregation process, process verification processing data deployed in the local consensus sub-chain, to perform verification processing on the service aggregation process to obtain a verification processing result.

The service verification unit 226 is further configured to: if the verification processing result indicates that the service aggregation process is a registered aggregation process that has been registered and examined in the global consensus network, deploy, in the local consensus sub-chain, verification processing data corresponding to the service aggregation process, and authorize the service processing node to start the service aggregation process.

The service verification unit 226 is further configured to receive aggregation service registration information obtained after the global consensus node registers and examines the service aggregation process; where the aggregation service registration information includes a service identification of the service aggregation process and circuit digest information of a zero-knowledge proof circuit corresponding to the service aggregation process.

The service verification unit 226 is further configured to write the aggregation service registration information into the process verification processing data.

Figure 12:
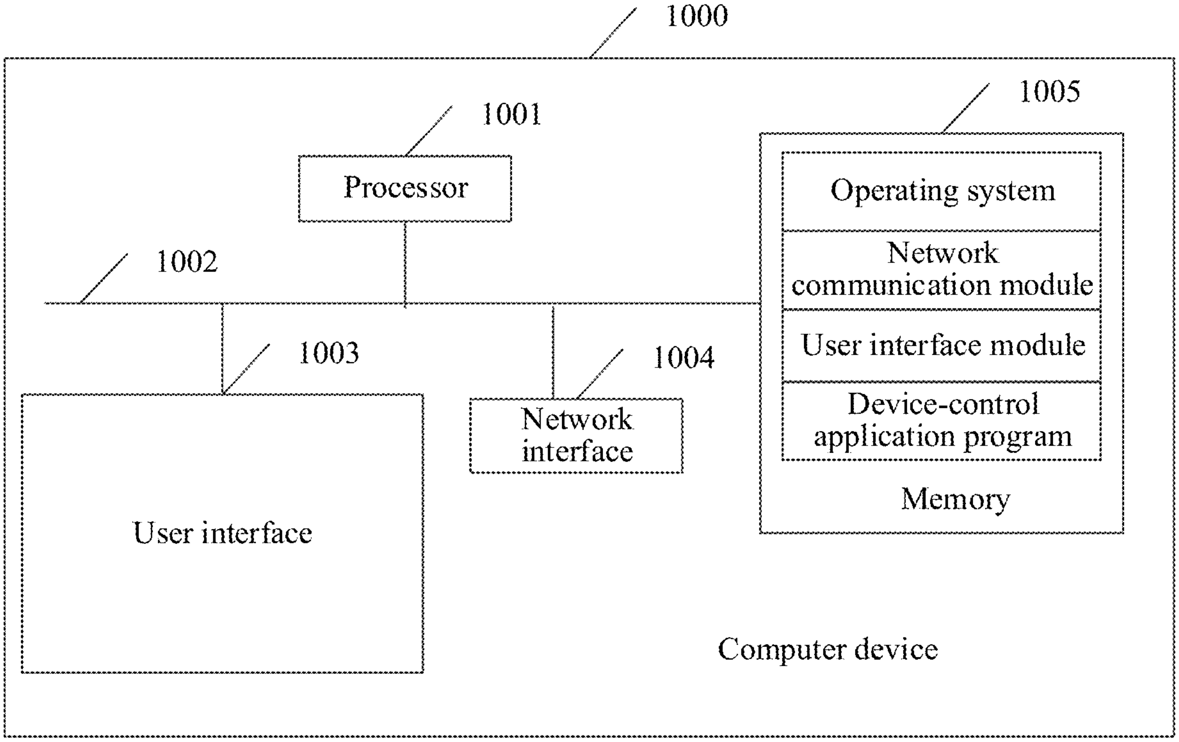
FIG. 12 is a schematic structural diagram of a computer device according to an embodiment of this application.

FIG. 12 is a schematic structural diagram of a computer device according to an embodiment of this application. As shown in FIG. 12, the computer device 1000 may include: a processor 1001, a network interface 1004, and a memory 1005, and in addition, the computer device 1000 may further include: a user interface 1003, and at least one communication bus 1002. The communication bus 1002 is configured to implement connection and communication between these components. The user interface 1003 may include a display and a keyboard. In an embodiment, the user interface 1003 may further include a standard wired interface and wireless interface. The network interface 1004 may include a standard wired interface and wireless interface (for example, a WiFi interface). In an embodiment, the memory 1005 may be a high-speed RAM memory, or may be a non-volatile memory, for example, at least one magnetic disk memory. In some embodiments, the memory 1005 may alternatively be at least one storage apparatus away from the processor 1001. As shown in FIG. 12, the memory 1005 used as a computer-readable storage medium may include an operating system, a network communications module, a user interface module, and a device-control application program.

In the computer device 1000 shown in FIG. 12, the network interface 1004 may provide a network communication function. The user interface 1003 is mainly configured to provide an input interface for a user. The processor 1001 may be configured to invoke a device-control application program stored in the memory 1005, so as to execute the description of the data processing method in any one of the foregoing corresponding embodiments. Details are not described herein again. In addition, the description of beneficial effects of the same method are not described herein again.

Besides, an embodiment of this application further provides a computer-readable storage medium. The computer-readable storage medium stores a computer program executed by the data processing apparatus 1 based on a hierarchical chain and the data processing apparatus 2 based on a hierarchical chain, and the computer program includes program instructions. When the processor executes the program instructions, the description of the data processing method based on a hierarchical chain in the foregoing embodiment can be executed. Therefore, details are not described herein again. In addition, the description of beneficial effects of the same method are not described herein again. For technical details that are not disclosed in the embodiments of the computer-readable storage medium in this application, refer to the descriptions of the method embodiments of this application.

The computer-readable storage medium may be the data processing apparatus based on a hierarchical chain in any one of the above embodiments or an internal storage unit of the computer device, such as a hard disk or a memory of the computer device. The computer-readable storage medium may also be an external storage device of the computer device, such as a plug-in hard disk equipped on the computer device, a smart media card (SMC), a secure digital (SD) card, a flash card, or the like. Further, the computer-readable storage medium may also include both the internal storage unit and the external storage device of the computer device. The computer-readable storage medium is configured to store the computer program and other programs and data that are required by the computer device. The computer-readable storage medium can also be configured to temporarily store data that has been outputted or will be outputted.

Besides, an embodiment of this application further provides a computer program product or a computer program, the computer program product or the computer program including computer instructions, and the computer instructions being stored in a computer-readable storage medium. A processor of a computer device reads the computer instructions from the computer-readable storage medium, and the processor executes the computer instructions, so that the computer device executes the method provided in any one of the foregoing corresponding embodiments. In addition, the description of beneficial effects of the same method are not described herein again. For the technical details not disclosed in the embodiment of the computer program product or the computer program in the application, refer to the description of the method embodiments of this application.

A person of ordinary skill in the art may understand that, units and algorithm operations of the examples described in the foregoing disclosed embodiments may be implemented by electronic hardware, computer software, or a combination thereof. To clearly describe the interchangeability between the hardware and the software, the foregoing has generally described compositions and operations of each example based on functions. Whether the functions are executed in a mode of hardware or software depends on particular applications and design constraint conditions of the technical solutions. A person skilled in the art can use different methods to implement the described functions for each particular application, but the implementation does not go beyond the scope of this application.

What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. A data processing method based on a hierarchical chain, a hierarchical chain network corresponding to the hierarchical chain comprising a local consensus network deployed in a service layer and a global consensus network deployed in a consensus layer, a local consensus node and a service processing node being deployed in the service layer, the local consensus node being a consensus node in the local consensus network, the global consensus node deployed in the consensus layer being a consensus node in the global consensus network, the local consensus node being configured to: when determining that the service aggregation process of the service processing node has been registered and examined on the global consensus node, authorize the service processing node to start the service aggregation process, the method being performed by the service processing node, and the method comprising:

invoking, when N services are aggregated and packaged into a block to be processed, the service aggregation process to execute the block to be processed, to obtain a service execution result of each service and a service execution proof associated with each service, N being a positive integer, each service being a sensitive service that carries sensitive data and that is transmitted by a service node associated with the local consensus node, and the service execution proof indicating that each service is correctly executed;

determining the service execution result of each service as a block execution result of the block to be processed;

invoking the service aggregation process to optimize the block execution result, to obtain a block optimization result and an optimization proof associated with the block execution result, comprising:

obtaining, from a zero-knowledge proof circuit corresponding to the service aggregation process, a zero-knowledge proof optimization circuit associated with the block execution result, and invoking the zero-knowledge proof optimization circuit to optimize the data of the block execution result, to obtain the block optimization result and the optimization proof associated with the block execution result;

obtaining, based on the block optimization result, a result hash of the block execution result, a service hash of each service, the service execution proof, the optimization proof, and a blockhead of the block to be processed, a backhaul service to be backhauled to the local consensus node; and backhauling the backhaul service to the local consensus node, the local consensus node invokes verification processing data corresponding to the service aggregation process, to perform service verification on the backhaul service to obtain a service verification result to be returned to the service node.

2. The method according to claim 1, wherein the optimization referring to hiding or blurring the sensitive data in the service execution result of each service, the block optimization result referring to an optimized block execution result, the service verification referring to verifying, by using a circuit proof in the backhaul service, that the block optimization result is obtained through correct execution and optimization, and the circuit proof comprising the service execution proof and the optimization proof, and the optimization proof indicating that the block execution result is optimized, and the invoking the service aggregation process to execute N services in the block to be processed, to obtain N service execution results corresponding to the N services and service execution proofs associated with the N services comprises:

obtaining, from the zero-knowledge proof circuit corresponding to the service aggregation process, a zero-knowledge proof execution circuit associated with the block to be processed, and invoking the zero-knowledge proof execution circuit to execute each service in the block to be processed, to obtain the N service execution results of all the services and the service execution proofs associated with all the services.

3. The method according to claim 1, wherein the service node comprises a first service node deployed in the hierarchical chain network, the first service node is a node that is in a service network of the hierarchical chain network and that is configured to transmit a service to the local consensus node, and the service transmitted by the first service node to the local consensus node is a first service; and the method further comprises:

receiving the first service forwarded by the local consensus node, and using the first service as a service of the N services; wherein a service type of the first service is consistency with a service type of each of the services.

4. The method according to claim 1, wherein the service node comprises a second service node deployed in the hierarchical chain network, and the second service node is a node that is in a service network of the hierarchical chain network and that is configured to directly transmit a service to the service processing node; and the method further comprises:

receiving a second service transmitted by the second service node, and using the received second service as a service of the N services; wherein a service type corresponding to the second service is consistency with a service type of each of the N services.

5. The method according to claim 4, wherein the block execution result comprises a service execution result of the second service; and the service execution result of the second service is recorded when the second service in the block to be processed is executed; and the method further comprises:

returning the service execution result of the second service to the second service node.

6. The method according to claim 5, wherein the block optimization result comprises an optimized service execution result of the second service; and the optimized service execution result of the second service is obtained after optimizing data of the service execution result of the second service during optimization of the block execution result; and the method further comprises:

returning the optimized service execution result of the second service to the second service node.

7. The method according to claim 1, wherein a data service network corresponding to the service processing node is independent of the global consensus network and the local consensus network; and a data chain corresponding to the data service network is constructed based on service types of the N services; and the method further comprises:

using, when obtaining the block optimization result, the block to be processed as a target block to be linked to the data chain; and writing the target block into the data chain based on a data linking policy indicated by the service aggregation process; wherein the data linking policy is a policy that the target block is directly written into the data chain when it is determined, by using the zero-knowledge proof circuit in the service aggregation process, that each service is correctly executed.

8. The method according to claim 7, wherein the data service network comprises a secondary service node other than the service processing node; and the secondary service node is a data backup node configured to perform block backup processing on the target block; and the method further comprises:

transmitting the target block to the data backup node when the target block is written into the data chain, so that the data backup node performs block backup processing on the target block.

9. A computer device of a service processing node, comprising a memory and a processor, the memory being connected to the processor, the memory being configured to store a computer program, and the processor being configured to invoke the computer program, so that the computer device performs a data processing method based on a hierarchical chain, a hierarchical chain network corresponding to the hierarchical chain comprising a local consensus network deployed in a service layer and a global consensus network deployed in a consensus layer, a local consensus node and the service processing node being deployed in the service layer, the local consensus node being a consensus node in the local consensus network, the global consensus node deployed in the consensus layer being a consensus node in the global consensus network, the local consensus node being configured to: when determining that the service aggregation process of the service processing node has been registered and examined on the global consensus node, authorize the service processing node to start the service aggregation process, the processor of the service processing node being configured to perform:

invoking, when N services are aggregated and packaged into a block to be processed, the service aggregation process to execute the block to be processed, to obtain a service execution result of each service and a service execution proof associated with each service, N being a positive integer, each service being a sensitive service that carries sensitive data and that is transmitted by a service node associated with the local consensus node, and the service execution proof indicating that each service is correctly executed;

determining the service execution result of each service as a block execution result of the block to be processed;

invoking the service aggregation process to optimize the block execution result, to obtain a block optimization result and an optimization proof associated with the block execution result, comprising:

obtaining, from a zero-knowledge proof circuit corresponding to the service aggregation process, a zero-knowledge proof optimization circuit associated with the block execution result, and invoking the zero-knowledge proof optimization circuit to optimize the data of the block execution result, to obtain the block optimization result and the optimization proof associated with the block execution result;

obtaining, based on the block optimization result, a result hash of the block execution result, a service hash of each service, the service execution proof, the optimization proof, and a blockhead of the block to be processed, a backhaul service to be backhauled to the local consensus node; and backhauling the backhaul service to the local consensus node, the local consensus node invokes verification processing data corresponding to the service aggregation process, to perform service verification on the backhaul service to obtain a service verification result to be returned to the service node.

10. The computer device according to claim 9, wherein the optimization referring to hiding or blurring the sensitive data in the service execution result of each service, the block optimization result referring to an optimized block execution result, and the optimization proof indicating that the block execution result is optimized, the service verification referring to verifying, by using a circuit proof in the backhaul service, that the block optimization result is obtained through correct execution and optimization, and the circuit proof comprising the service execution proof and the optimization proof, and the invoking the service aggregation process to execute N services in the block to be processed, to obtain N service execution results corresponding to the N services and service execution proofs associated with the N services comprises:

obtaining, from the zero-knowledge proof circuit corresponding to the service aggregation process, a zero-knowledge proof execution circuit associated with the block to be processed, and invoking the zero-knowledge proof execution circuit to execute each service in the block to be processed, to obtain the N service execution results of all the services and the service execution proofs associated with all the services.

11. The computer device according to claim 9, wherein the service node comprises a first service node deployed in the hierarchical chain network, the first service node is a node that is in a service network of the hierarchical chain network and that is configured to transmit a service to the local consensus node, and the service transmitted by the first service node to the local consensus node is a first service; and the processor is further configured to perform:

receiving the first service forwarded by the local consensus node, and using the first service as a service of the N services; wherein a service type of the first service is consistency with a service type of each of the services.

12. The computer device according to claim 9, wherein the service node comprises a second service node deployed in the hierarchical chain network, and the second service node is a node that is in a service network of the hierarchical chain network and that is configured to directly transmit a service to the service processing node; and the processor is further configured to perform:

receiving a second service transmitted by the second service node, and using the received second service as a service of the N services; wherein a service type corresponding to the second service is consistency with a service type of each of the N services.

13. The computer device according to claim 12, wherein the block execution result comprises a service execution result of the second service; and the service execution result of the second service is recorded when the second service in the block to be processed is executed; and the processor is further configured to perform:

returning the service execution result of the second service to the second service node.

14. The computer device according to claim 13, wherein the block optimization result comprises an optimized service execution result of the second service; and the optimized service execution result of the second service is obtained after optimizing data of the service execution result of the second service during optimization of the block execution result; and the processor is further configured to perform:

returning the optimized service execution result of the second service to the second service node.

15. The computer device according to claim 9, wherein a data service network corresponding to the service processing node is independent of the global consensus network and the local consensus network; and a data chain corresponding to the data service network is constructed based on service types of the N services; and the processor is further configured to perform:

using, when obtaining the block optimization result, the block to be processed as a target block to be linked to the data chain; and writing the target block into the data chain based on a data linking policy indicated by the service aggregation process; wherein the data linking policy is a policy that the target block is directly written into the data chain when it is determined, by using the zero-knowledge proof circuit in the service aggregation process, that each service is correctly executed.

16. The computer device according to claim 15, wherein the data service network comprises a secondary service node other than the service processing node; and the secondary service node is a data backup node configured to perform block backup processing on the target block; and the processor is further configured to perform:

transmitting the target block to the data backup node when the target block is written into the data chain, so that the data backup node performs block backup processing on the target block.

17. A non-transitory computer readable storage medium, storing computer instructions executable by at least one processor of a service processing node based on a hierarchical chain, wherein a hierarchical chain network corresponding to the hierarchical chain comprises a local consensus network deployed in a service layer and a global consensus network deployed in a consensus layer, a local consensus node and a service processing node are deployed in the service layer, the local consensus node is a consensus node in the local consensus network, the global consensus node deployed in the consensus layer is a consensus node in the global consensus network, the local consensus node is configured to: when determining that the service aggregation process of the service processing node has been registered and examined on the global consensus node, authorize the service processing node to start the service aggregation process, and wherein the computer instructions, when being executed, cause the at least one processor of the service processing node to perform:

invoking, when N services are aggregated and packaged into a block to be processed, the service aggregation process to execute the block to be processed, to obtain a service execution result of each service and a service execution proof associated with each service, N being a positive integer, each service being a sensitive service that carries sensitive data and that is transmitted by a service node associated with the local consensus node, and the service execution proof indicating that each service is correctly executed;

determining the service execution result of each service as a block execution result of the block to be processed;

invoking the service aggregation process to optimize the block execution result, to obtain a block optimization result and an optimization proof associated with the block execution result, comprising:

obtaining, from a zero-knowledge proof circuit corresponding to the service aggregation process, a zero-knowledge proof optimization circuit associated with the block execution result, and invoking the zero-knowledge proof optimization circuit to optimize the data of the block execution result, to obtain the block optimization result and the optimization proof associated with the block execution result;

obtaining, based on the block optimization result, a result hash of the block execution result, a service hash of each service, the service execution proof, the optimization proof, and a blockhead of the block to be processed, a backhaul service to be backhauled to the local consensus node; and backhauling the backhaul service to the local consensus node, the local consensus node invokes verification processing data corresponding to the service aggregation process, to perform service verification on the backhaul service to obtain a service verification result to be returned to the service node.

18. The storage medium according to claim 17, wherein the optimization referring to hiding or blurring the sensitive data in the service execution result of each service, the block optimization result referring to an optimized block execution result, the service verification referring to verifying, by using a circuit proof in the backhaul service, that the block optimization result is obtained through correct execution and optimization, and the circuit proof comprising the service execution proof and the optimization proof, and the optimization proof indicating that the block execution result is optimized, and the invoking the service aggregation process to execute N services in the block to be processed, to obtain N service execution results corresponding to the N services and service execution proofs associated with the N services comprises:

obtaining, from the zero-knowledge proof circuit corresponding to the service aggregation process, a zero-knowledge proof execution circuit associated with the block to be processed, and invoking the zero-knowledge proof execution circuit to execute each service in the block to be processed, to obtain the N service execution results of all the services and the service execution proofs associated with all the services.

19. The storage medium according to claim 17, wherein the service node comprises a first service node deployed in the hierarchical chain network, the first service node is a node that is in a service network of the hierarchical chain network and that is configured to transmit a service to the local consensus node, and the service transmitted by the first service node to the local consensus node is a first service; and the computer instructions further cause the at least one processor to perform:

receiving the first service forwarded by the local consensus node, and using the first service as a service of the N services; wherein a service type of the first service is consistency with a service type of each of the services.

20. The storage medium according to claim 17, wherein the service node comprises a second service node deployed in the hierarchical chain network, and the second service node is a node that is in a service network of the hierarchical chain network and that is configured to directly transmit a service to the service processing node; and the computer instructions further cause the at least one processor to perform:

receiving a second service transmitted by the second service node, and using the received second service as a service of the N services; wherein a service type corresponding to the second service is consistency with a service type of each of the N services.

* * * * *